US008877056B2

(12) United States Patent
Williams et al.

(10) Patent No.: US 8,877,056 B2
(45) Date of Patent: Nov. 4, 2014

(54) METHODS AND MEANS FOR ECONOMICALLY ASSURING IMPROVED POTABLE WATER QUALITY MANAGEMENT FOR AIRCRAFT AND OTHER APPLICATIONS

(75) Inventors: Richard T. Williams, Glenmoore, PA (US); Carl Beiswenger, Pottstown, PA (US)

(73) Assignee: General Ecology, Inc., Exton, PA (US)

( * ) Notice: Subject to any disclaimer, the term of this patent is extended or adjusted under 35 U.S.C. 154(b) by 820 days.

(21) Appl. No.: 12/383,578

(22) Filed: Mar. 25, 2009

(65) Prior Publication Data

US 2010/0243581 A1    Sep. 30, 2010

(51) Int. Cl.
| C02F 1/00 | (2006.01) |
| C02F 1/50 | (2006.01) |
| B01D 35/02 | (2006.01) |
| B01D 35/147 | (2006.01) |
| B01D 35/027 | (2006.01) |
| B64D 11/02 | (2006.01) |

(52) U.S. Cl.
CPC ............. *C02F 1/003* (2013.01); *B01D 35/027* (2013.01); *B01D 35/02* (2013.01); *B01D 35/147* (2013.01); *B64D 11/02* (2013.01); *C02F 1/50* (2013.01)
USPC .................. 210/257.1; 210/258; 210/167.05; 210/435; 210/198.1; 210/767; 210/420; 210/424

(58) Field of Classification Search
None
See application file for complete search history.

(56) References Cited

U.S. PATENT DOCUMENTS

| 925,962 | A | * | 6/1909 | Gold ............................... 33/423 |
| 2,939,484 | A | * | 6/1960 | Leuthesser ..................... 137/635 |
| 4,051,870 | A | * | 10/1977 | Nordentoft ................ 137/636.2 |
| 4,241,770 | A |  | 12/1980 | Robertson |
| 4,268,383 | A |  | 5/1981 | Trobaugh |
| 4,466,457 | A | * | 8/1984 | Brane et al. .............. 137/599.12 |
| 4,585,400 | A |  | 4/1986 | Miller |
| 4,874,010 | A | * | 10/1989 | DeJong et al. ............. 137/484.4 |
| 4,972,877 | A | * | 11/1990 | Halemba et al. ......... 137/625.29 |
| 5,282,972 | A | * | 2/1994 | Hanna et al. ................... 210/652 |
| 5,439,174 | A |  | 8/1995 | Sweet |
| 5,967,185 | A | * | 10/1999 | Baruschke et al. ...... 137/625.29 |
| 6,193,884 | B1 |  | 2/2001 | Magnusson et al. |
| 7,238,278 | B2 |  | 7/2007 | Coffey et al. |
| 7,410,581 | B2 |  | 8/2008 | Arnold et al. |
| 2001/0040121 | A1 |  | 11/2001 | Giordano et al. |
| 2001/0045380 | A1 |  | 11/2001 | Khan |
| 2004/0104157 | A1 |  | 6/2004 | Beeman et al. |

(Continued)

OTHER PUBLICATIONS

International Search Report issued by the International Searching Authority in PCT International Application No. PCT/US2010/000006, completed on May 24, 2010.

(Continued)

*Primary Examiner* — Krishnan S Menon
(74) *Attorney, Agent, or Firm* — John F. A. Earley, III; Frank J. Bonini, Jr.; Harding, Earley, Follmer & Frailey, P.C.

(57) ABSTRACT

A potable water distribution system for use in aircraft, as well as potable water systems of boats, recreational vehicles/caravans, residential homes, dental offices, laboratories, vending machines, and the like, provides for sanitizing of the system without opening filter and/or purification units and removing filtering and/or purifying cartridges from the filter and/or purification units during the sanitizing process.

21 Claims, 15 Drawing Sheets

Exhibit 2.1   Aircraft Onboard Water System

(56) References Cited

U.S. PATENT DOCUMENTS

| | | |
|---|---|---|
| 2005/0103725 A1 | 5/2005 | Palm et al. |
| 2005/0167352 A1 | 8/2005 | Burrows et al. |
| 2006/0108435 A1* | 5/2006 | Kozdras et al. ............. 236/93 R |
| 2006/0231146 A1* | 10/2006 | Lillback ................... 137/625.47 |
| 2007/0119768 A1* | 5/2007 | Duplessis et al. ............. 210/252 |
| 2007/0144953 A1 | 6/2007 | Rivi |
| 2007/0262004 A1* | 11/2007 | Jordan et al. .................. 210/110 |
| 2008/0267820 A1* | 10/2008 | Murg .............................. 422/33 |
| 2010/0133155 A1* | 6/2010 | Nolan ............................. 210/98 |
| 2010/0170857 A1* | 7/2010 | Williams et al. .............. 210/741 |

OTHER PUBLICATIONS

Written Opinion of the International Searching Authority issued by the International Searching Authority in PCT International Application No. PCT/US2010/000006, completed on May 24, 2010.

Supplementary European Search Report in related European Patent Application No. EP 10 72 6815, Mar. 13, 2013.

* cited by examiner

Typical Layout
Potable Water Distribution System

Simplified Schematic of Aircraft with Potable Water Recirculation System—somtimes used on customized aircraft such as "Head of State" and other VIP types

METHODS AND MEANS FOR ECONOMICALLY ASSURING IMPROVED POTABLE WATER QUALITY MANAGEMENT FOR AIRCRAFT AND OTHER APPLICATIONS

FIELD OF THE INVENTION

This invention relates to potable water distribution systems for, for example, aircraft, and more particularly concerns potable water sanitizing systems for potable water distribution systems for, for example, aircraft.

BACKGROUND OF THE INVENTION

Aircraft Potable Water—

Adequate hydration is particularly important for comfortable air travel, especially aboard modern, very large, long range aircraft capable of flights of 20 or more hour duration. Typically, water is distributed to galleys, lavatories, and drinking water outlets of the aircraft to provide drinking water to passengers, to provide water for food and beverage preparation, and to provide water for personal hygiene (e.g., face and hand rinsing, teeth cleaning, etc.) during flights.

Aircraft typically are crowded with thousands of passengers, including babies, small children, handicapped people, possibly ill people, and others, from varied backgrounds, passing through a commercial passenger aircraft during a single week. Both passengers and crews contribute to microorganism populations aboard aircraft, and special precautions must be taken to minimize and avoid the possibility of bacteria, viruses, pathogenic cysts, and other microorganisms being transferred among passengers through the water distribution system. Further, water is supplied to aircraft from many locations and varies widely in taste and sanitary quality.

In addition to point-of-use effective on-board drinking water microfilters/purifiers, a primary sanitation defense mechanism against bacteria and viruses is to maintain an adequate residual of chlorine, preferably free chlorine, within water storage and distribution systems. Further, effective on-board point-of-use drinking water microfilters/purifiers reliably remove parasitic cysts (leading causes of water borne disease worldwide) such as Giradia and Crypto which are not controlled by chlorination.

Aircraft Water Distribution and Management—

Typically, an aircraft water distribution system comprises a water storage tank supplying a centralized distribution line with various branches or legs extending from the central distribution line to many locations throughout the aircraft. Part of a typical aircraft water distribution system is illustrated schematically in FIG. 1 (EPA Proposed ADWR Exhibit 2.1). For example, water is distributed to galleys, lavatories, and other locations as needed for food and beverage preparation and for personal hygiene during flights. Galleys include many "service points" such as coffee makers, water boilers, and drinking water outlets. Similarly, lavatories often include drinking water outlets and may be used for face and hand rinsing, cleaning teeth and short term personal medication. As illustrated in FIG. 2 (EPA Proposed ADWR Exhibit 2.2), there are many possible opportunities for aircraft drinking water systems/supplies to become contaminated with microorganisms even if hygienically safe when loaded aboard an aircraft.

Typically, water filter/purifier units, each comprising a housing pressure vessel and a filtration and/or purification element, usually a cartridge, are installed in or near galleys and lavatories as part of the aircraft water distribution system to improve water quality and safety for consumption and for food and beverage preparation. Purifiers (water filter/purifiers having a purification element) must be independently certified to meet the EPA Guide Standard Protocol for Microbiological Purifiers relative to bacteria, viruses and cysts. Structured Matrix™ purifiers, sold by General Ecology, Inc., also provide excellent filtration. Filters, such as General Ecology, Inc.'s "Structured Matrix™ microfilters or simple, fine, or coarse carbon and/or sediment systems, may be sophisticated, but such filters cannot legally be referred to as microbiological purifiers before being verified that they meet the EPA Guide Standard Protocol for Microbiological Purifiers. Space in galley and lavatory compartments is expensive and severely limited. Currently, water filter/purifier units usually are installed in "out of the way", often difficult to access locations behind other more frequently accessed equipment and behind bulkheads.

Sanitation Practices—

Possible microorganisms of concern are pathogenic bacteria, cysts and viruses. Chlorine resistant pathogenic cysts such as Crypto require special consideration and protective measures, such as providing point-of-use water filter/purifier units (e.g., water purifiers along the aircraft water distribution system to remove pathogenic cysts from the water moving through them). Such water filter/purifier units also remove bacteria, viruses, and other microorganisms from the water moving through them. Further, to overcome the challenges of virus and bacteria transmission via water systems and colonization within an aircraft potable water distribution system, airlines often try to assure that there is an adequate chlorine residual within the aircraft water supply. Even so it is necessary to periodically "sanitize" the aircraft water distribution system, typically with a 2+ hours soak of high concentration (100 ppm) chlorine solution. This sanitation process requires time and labor intensive removal of filtration/purification cartridges from units installed in galleys, fountains, and lavatories throughout the aircraft prior to the sanitization process. After removing cartridges, pressure vessels must be reassembled to allow complete distribution of the sanitizing solution through the water distribution system and to prevent leakage of this highly corrosive and oxidizing sanitizing solution during the two hours sanitization soak.

Cartridge removal is required for at least two reasons: 1) because a high concentration of chlorine is detrimental to most filtration/purification cartridges, and 2) more importantly, because microorganisms might be sheltered in crevices and imperfections at sealing surface interfaces (ideal locations for biofilm formation) of the water filter/purifier units compromising effectiveness of the sanitizing process, thereby allowing recolonization of the distribution system. Even though sanitization is recognized as effective, typically because of the relatively high cost of the sanitizing process and the revenue lost due to the downtime of the aircraft during the sanitizing process, sanitization is performed infrequently—possibly every six months or at a convenient "A Check" or more extensive maintenance intervals when other maintenance is carried out.

After chlorine flushing and soaking for two hours, following current practices, the pressure vessels once again are opened and the same cartridges (or new replacement cartridges) are installed. Potable water is flushed throughout the aircraft water distribution system to thoroughly remove the extremely high concentration sanitizing solutions. Several hours may be required to sanitize an aircraft resulting in costs averaging upwards to hundreds of dollars per unit. More efficient, lower cost sanitization would allow more frequent sanitization and provide possibly higher quality potable water with better economy and depending on procedures without replacing cartridges with each sanitizing procedure.

SUMMARY OF THE INVENTION

It is an object of the invention to provide a potable water distribution system for use in such things as aircraft, boats, recreational vehicles, residential homes, and the like, which has a sanitizing system for sanitizing the potable water distribution system.

Another object of the invention is to provide methods for sanitizing a potable water distribution system for use in such things as aircraft, boats, recreational vehicles, residential homes, and the like, and to provide apparatus used in conjunction therewith.

It is object of the invention to provide a bypass apparatus used in conjunction with the inventive potable water distribution system.

These and other objects of the invention are accomplished by our invention which is described below.

The invention provides a means for moving or circulating a sterilizing rinse and soak fluid throughout appropriately equipped aircraft, for example, without opening filter and/or purification units and removing cartridges during the process. Preferably, this sterilizing rinse fluid used to sanitize the aircraft potable water distribution system may be introduced to the aircraft potable water distribution system and removed after the desired soak period through standard aircraft water filling and draining ports outside the aircraft or recirculated to the sanitizing solution origin point/pump.

BRIEF DESCRIPTION OF THE DRAWINGS

FIG. 5 also includes a cutaway view of a portion of the cartridge 23.

FIG. 6 also includes a cutaway view of a portion of the cartridge 23.

DETAILED DESCRIPTION

Figure 3:
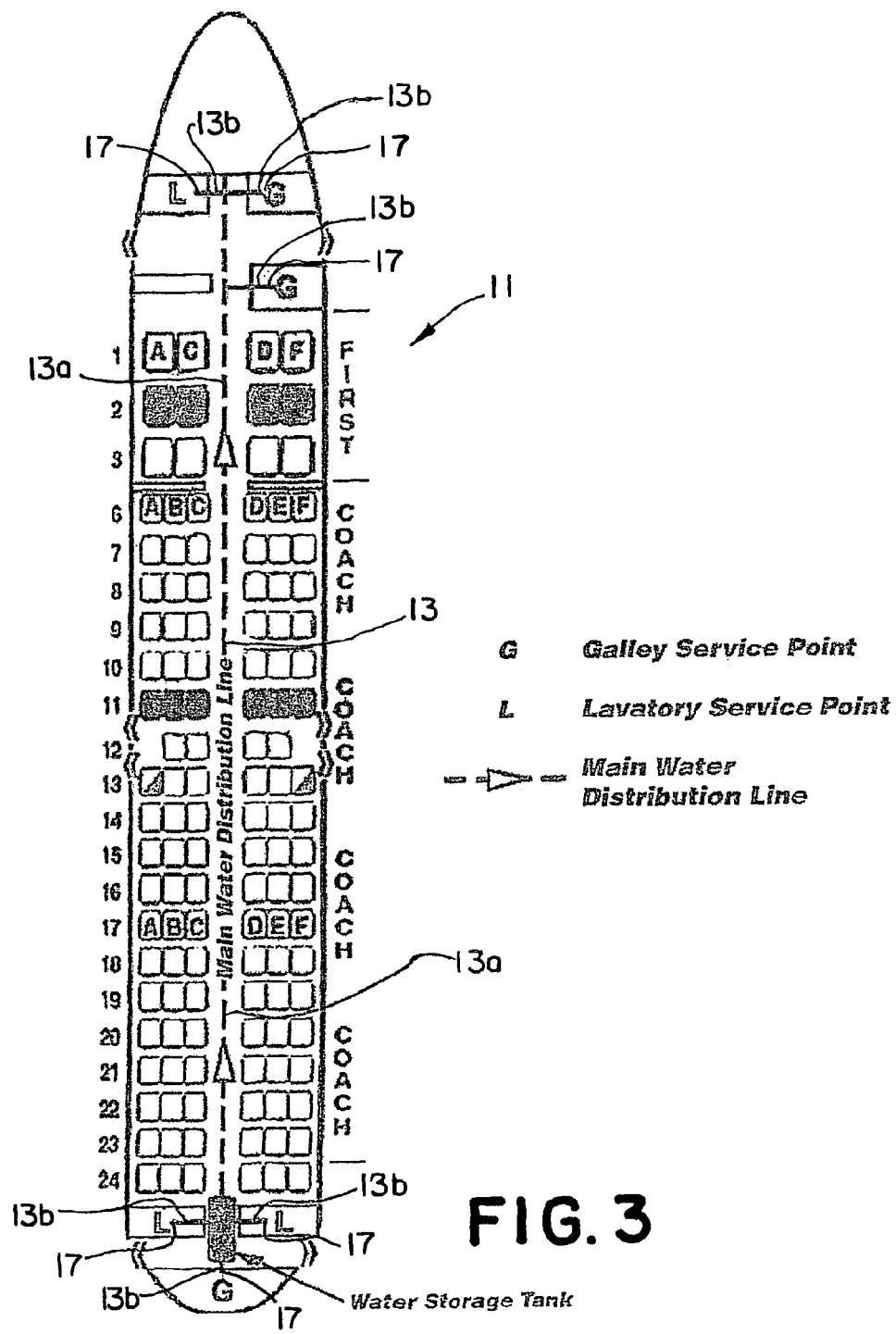
FIG. 3 is a schematic representation of a typical layout of a potable water distribution system in an aircraft.
Figure 4:
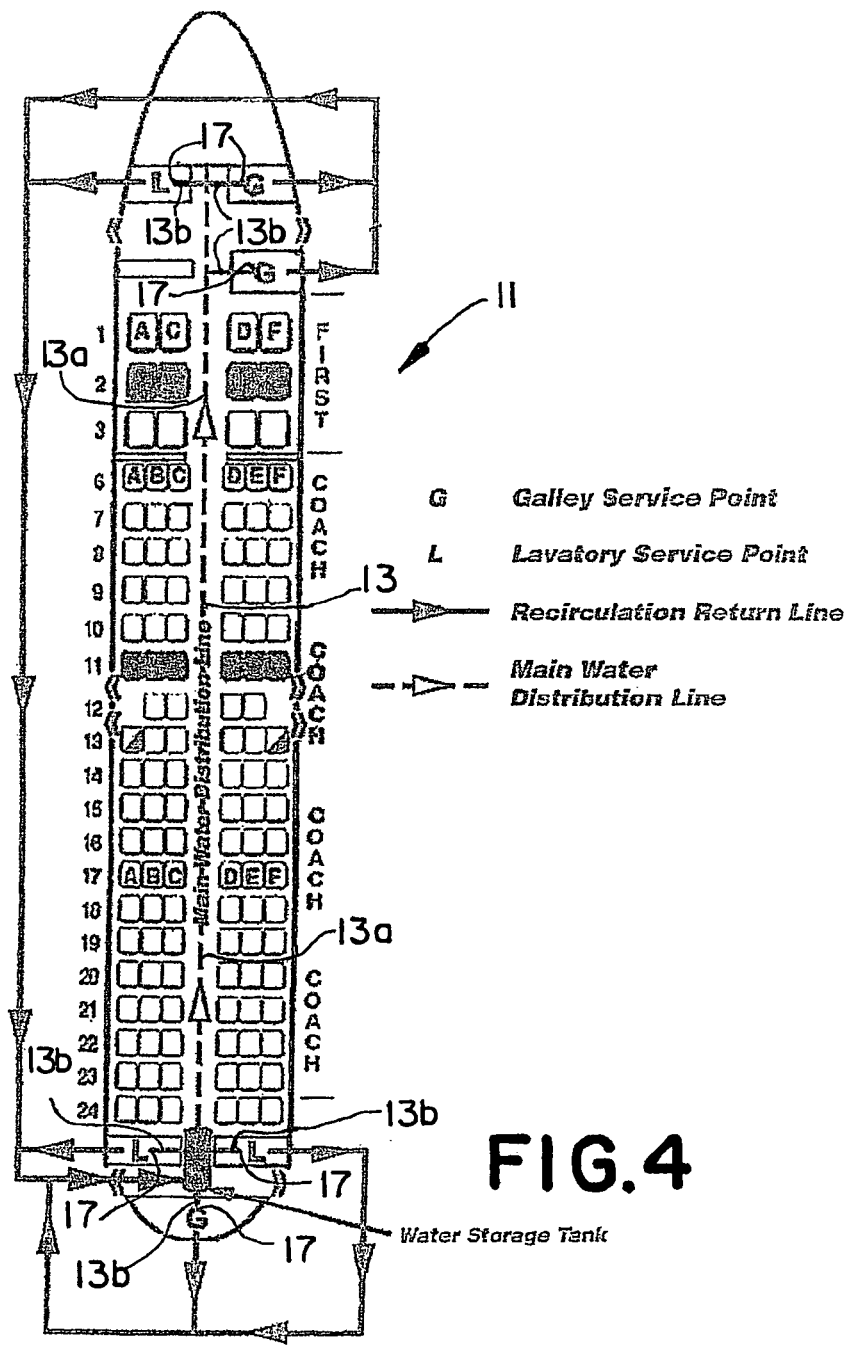
FIG. 4 is a schematic representation of a potable water recirculation system of an aircraft.

Turning to the drawings, there is shown in FIGS. 3 and 4 a potable water distribution system 11 of the invention. For illustrative purposes, the inventive potable water distribution system 11 is shown in the drawings in connection with its use in aircraft. However, the potable water distribution system 11 may be used in connection with other applications, such as in drinking water systems of recreational boats and yachts, commercial boats, recreational vehicles/caravans, residential homes, and water vending, cooling, warming and dispensing machines (such as those used in hospitals, schools, homes and factories). The inventive potable water distribution system 11 also may be applied to water systems in dental offices and laboratories.

Figure 1:
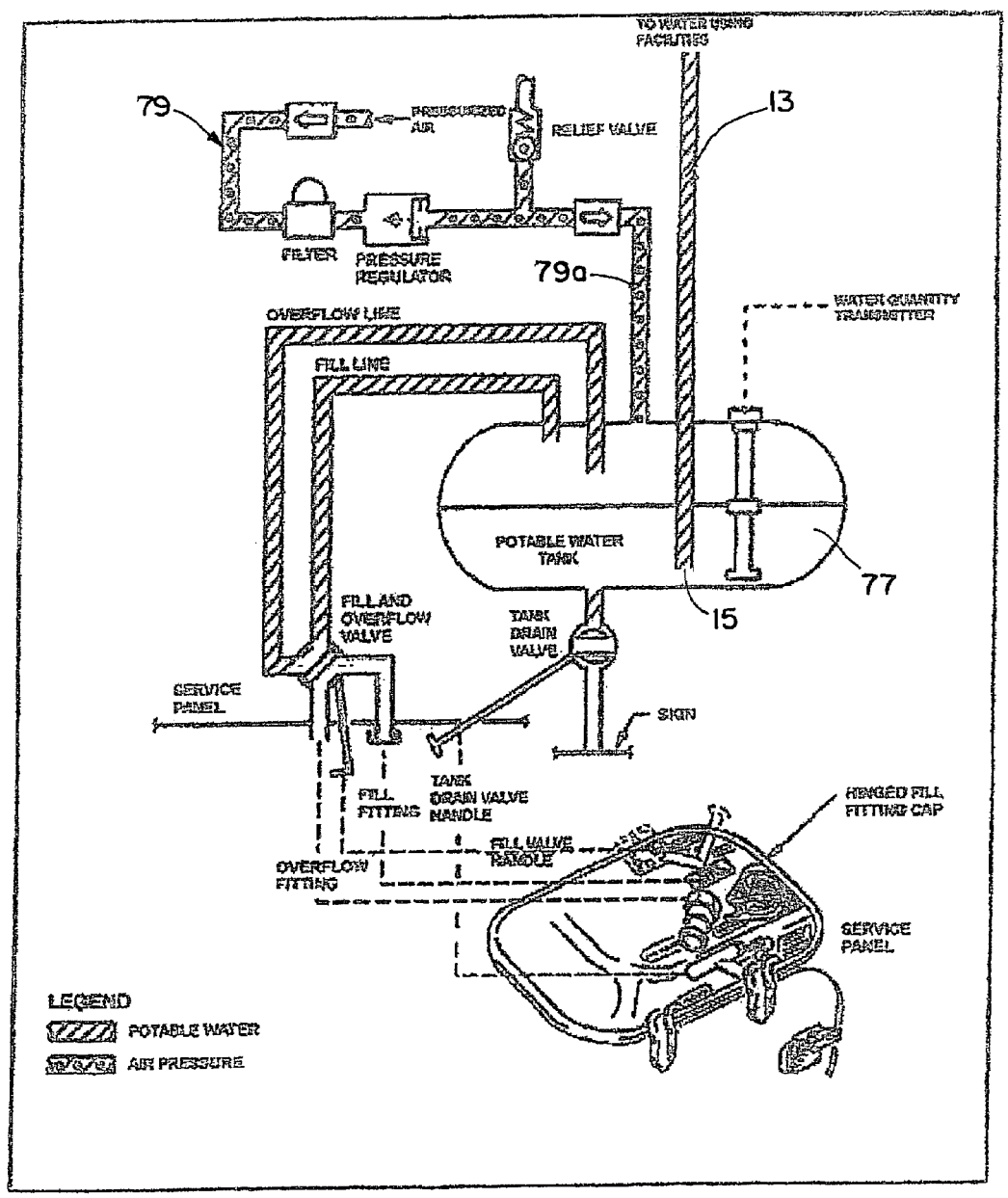
FIG. 1 is a schematic representation of an aircraft onboard water system.
Figure 2:
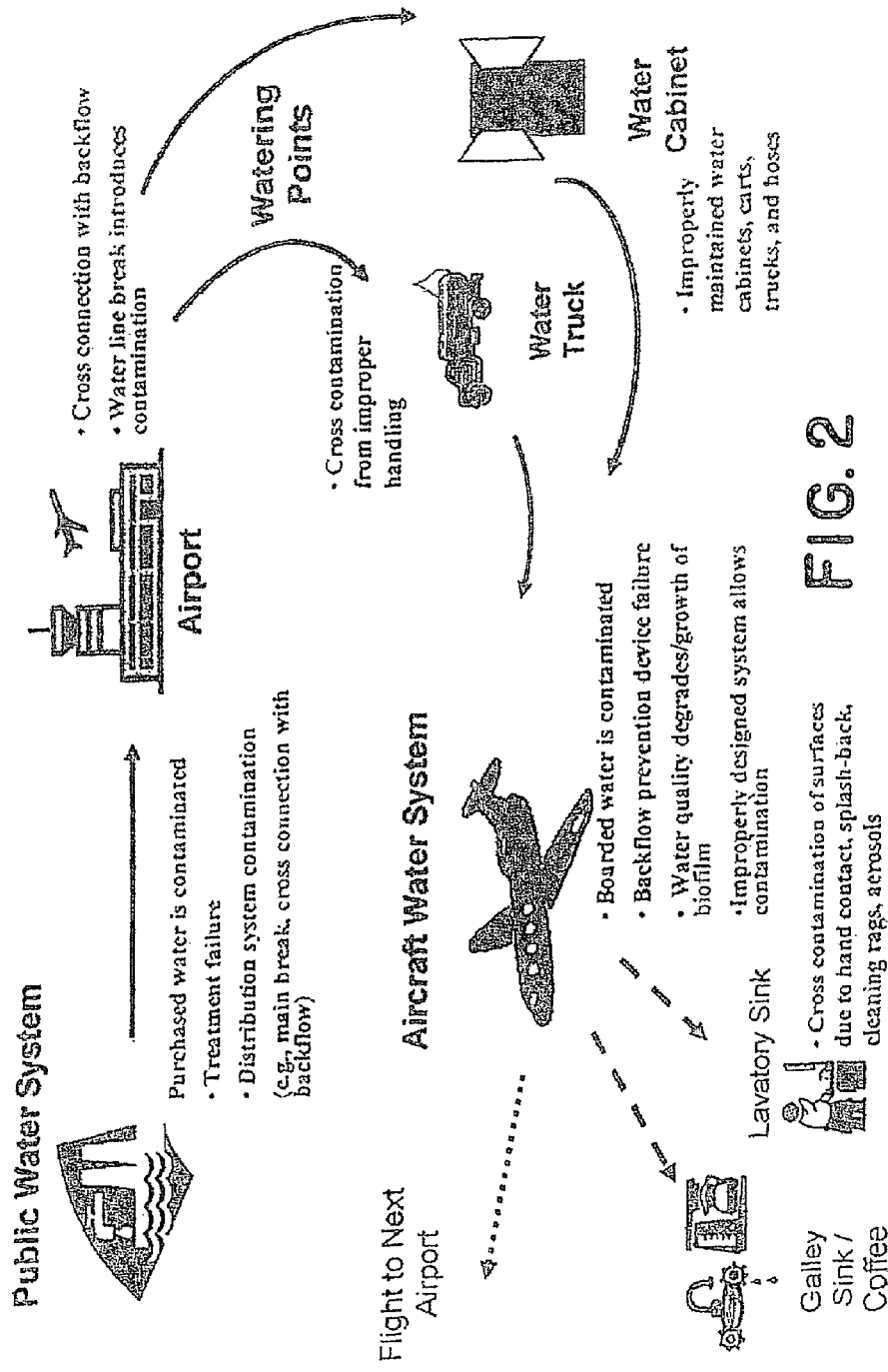
FIG. 2 is a schematic illustrating potential contamination pathways within an aircraft water system supply and transfer chain.

The potable water distribution system 11 has a distribution line 13 that has an inlet port 15 (FIG. 1). The distribution line 13, as illustrated in FIGS. 3 and 4 may have a main portion 13a and branch portions 13b which together form the distribution line 13. The distribution line 13 has at least one outlet port 17. In the embodiment of the invention illustrated in the drawings with respect to use of the inventive potable water distribution system 11 in aircraft, outlet ports 17 are located along the distribution line 13 at fountains, service points in galleys, and lavatories throughout the aircraft.

Figure 5:
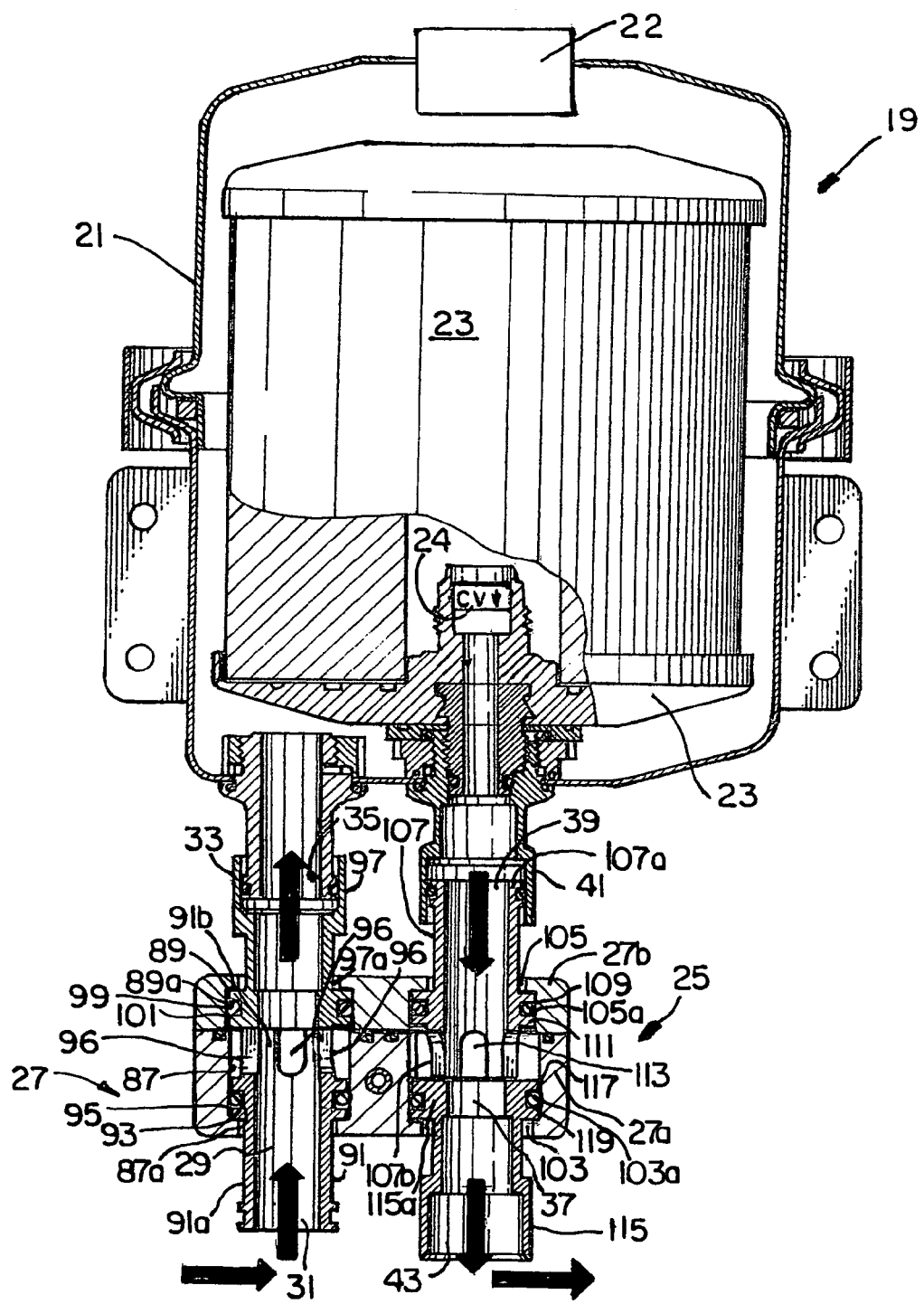
FIG. 5 is a view in partial cross-section of a bypass apparatus 25 connected to a filtering and/or conditioning and/or purifying device 19, illustrating the flow path of fluid from a distribution line through the bypass apparatus 25 and the filtering and/or conditioning and/or purifying device 19 when the bypass valve 47 of the bypass apparatus is closed.
Figure 6:
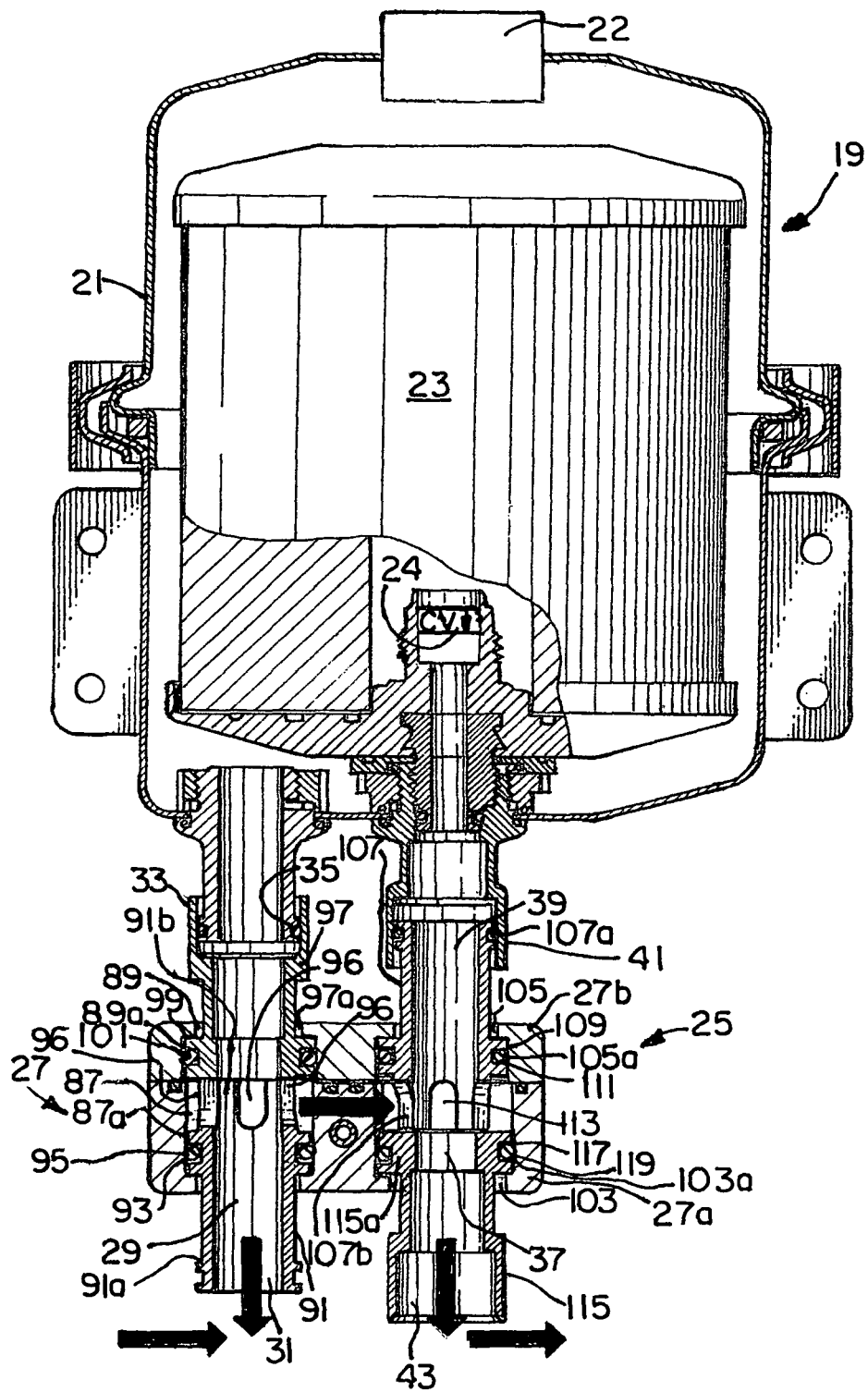
FIG. 6 is a view in partial cross-section of a bypass apparatus 25 connected to a filtering and/or conditioning and/or purifying device 19, illustrating the flow path of fluid from a distribution line through the bypass apparatus 25 when the bypass valve 47 of the bypass apparatus is open.
Figure 7:
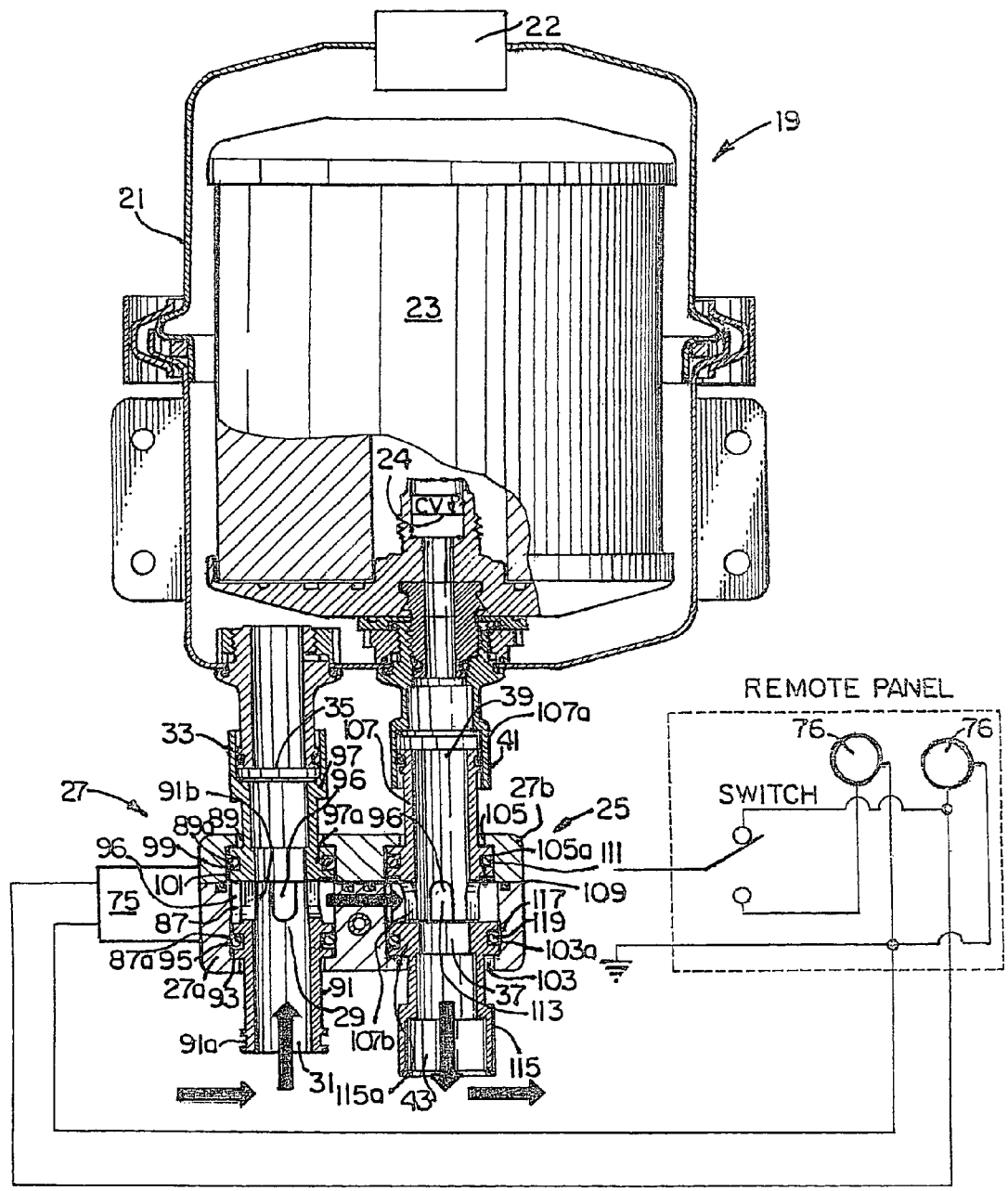
FIG. 7 is a view in partial cross section of a bypass apparatus 25 connected to a filtering and/or conditioning and/or purifying device 19, illustrating the flow path of fluid from a distribution line through the bypass apparatus 25 when the bypass valve 47 of the bypass apparatus is open, and illustrating schematically control of the bypass apparatus 25 by an actuator such as a solenoid.
Figure 8:
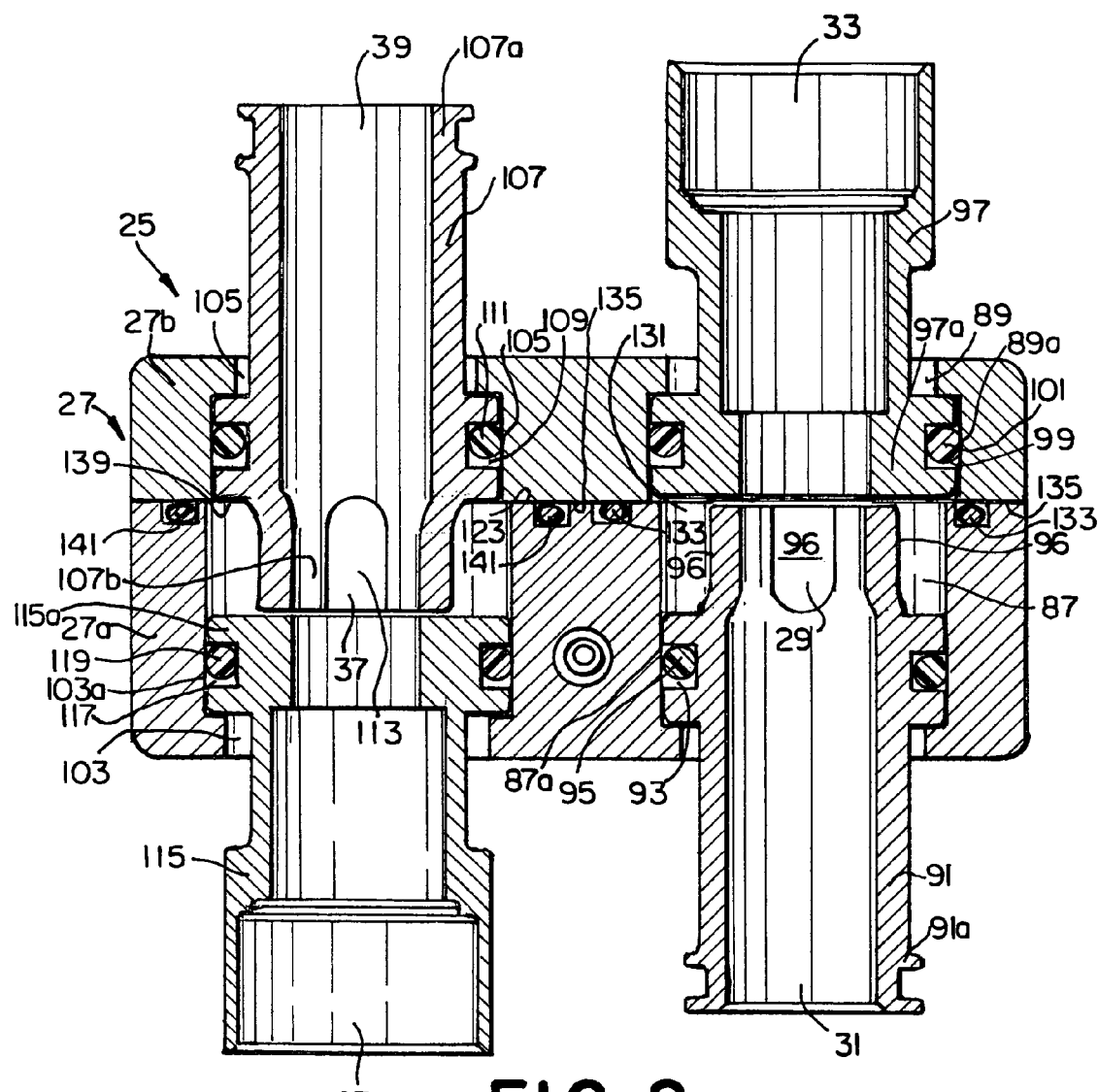
FIG. 8 is a view in cross-section of a bypass apparatus 25, constructed in accordance with the invention.
Figure 9:
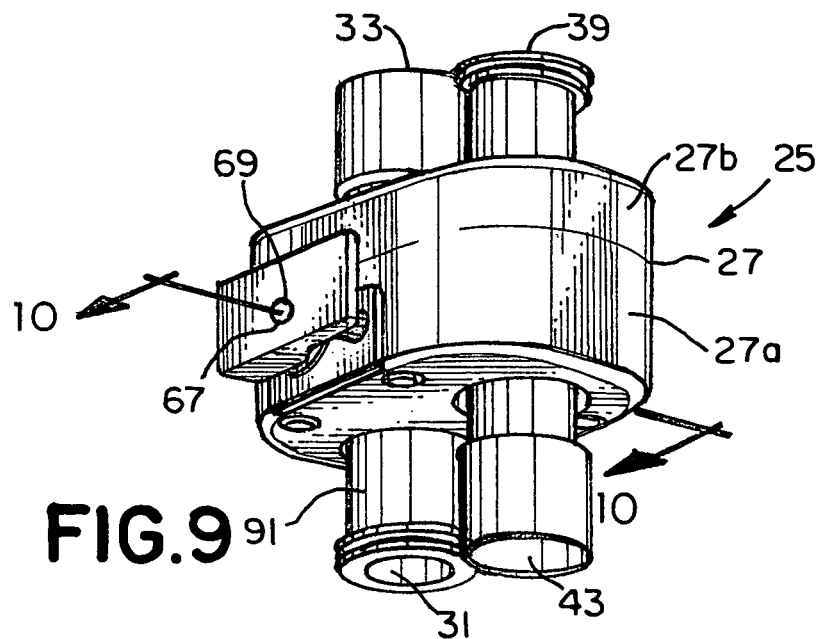
FIG. 9 is a view in perspective of a bypass apparatus 25, constructed in accordance with the invention.

Turning to FIGS. 5-7, the potable water distribution system also has at least one filtering and/or conditioning and/or purifying device 19 mounted along the distribution line 13 for filtering and/or conditioning and/or purifying a fluid received from the distribution line 13 before said fluid exits from the potable water distribution system 11 through an outlet port 17. The filtering and/or conditioning and/or purifying device 19 may comprise a housing pressure vessel (usually stainless steel, but sometimes made from a polymer or polymers) that holds a cartridge, or loose media, or the like for filtering and/or conditioning and/or purifying a fluid such as water. In the embodiment of the invention illustrated in the drawings with respect to use of the inventive potable water distribution system 11 in aircraft, a plurality of filtering and/or conditioning and/or purifying devices 19 are mounted along the distribution line 13 at fountains, service points in galleys, and lavatories throughout the aircraft to provide water for food and beverage preparation and to provide water for personal hygiene (e.g., face and hand rinsing, teeth cleaning, etc). In the embodiment illustrated in the drawings, each filtering and/or conditioning and/or purifying device 19 comprises a pressure vessel 21 that holds a cartridge 23 for filtering and/or conditioning and/or purifying the fluid moving through the filtering and/or conditioning and/or purifying device 19. The filtering and/or conditioning and/or purifying device 19, as well as the cartridge 23 therefor, may be obtained from General Ecology, Inc., of Exton, Pa. A preferred filtering and/or conditioning and/or purifying 19 is General Ecology's VERSA-PURE® AC3 filtration and purification system. The cartridge 23 may be configured to provide what the user desires for optimum service related to the application. For instance, the cartridge 23 may be configured to provide microbiological purification as independently certified to now current EPA Protocol for Microbiological Purifiers, or to provide scale control and taste and odor removal, or to provide taste and odor removal along with larger pathogen removal, etc. As shown in FIGS. 5 to 7, preferably, the filtering and/or conditioning and/or purifying device 19 includes a backflow prevention valve 24 at the outlet portion of each cartridge 23 to prevent possible backwards flow into the clean/purified water interior of the cartridge 23. When the bypass valve 47 (described below) is open, preferably a sanitizing solution having preferably 100 parts per million sanitizing agent, for example, may be provided to flow in continuous circuit through the third passageway 45 (described below), between the first passageway 29 and the second passageway 37 of each bypass apparatus 25 (described below) and return to the chlorination origin point/pump via the distribution line 13. Alternatively, after the sanitizing procedure has been completed, the sanitizing solution may be flushed from the distribution line 13 to waste. When the bypass valve 45 is open, the third passageway 45 connecting the first passageway 29 to the second passageway 37 has a lower resistance to flow of fluid through it than the resistance to flow of fluid through the filtering and/or conditioning and/or purifying device 19. When chlorine is used as the sanitizing agent, since chlorine is highly soluble, it diffuses into the inlet port 35 of the filtering and/or conditioning and/or purifying device 19 and, additionally, into the outlet port 41 of the filtering and/or conditioning and/or purifying device 19 to the face of the backflow prevention check valve 24 installed within the outlet portion of the cartridge 23. This valve 24 prevents excessive adsorption of chlorine within the interior of the cartridge 23. Further, because of the pressure gradient across cartridge 23, particularly across a purification cartridge such as General Ecology's RSA3 cartridge, properly controlled pressures allow a limited forward flow of the chlorine sanitizing rinse through the cartridge 23 during initial fill of the distribution system 11.

The pressure vessel 21 preferably is provided with an automatic venting device 22 for venting air contained in the pressure vessel 21.

The potable water distribution system 11 preferably is provided with a valve downstream from each filtering and/or conditioning and/or purifying device 19 for controlling when water which has been treated in the corresponding filtering and/or conditioning and/or purifying device 19 may exit the distribution line 13 through an outlet port 17 in, for example, a galley at "service points" such as coffee makers, water boilers, and drinking water outlets connected to a branch portion 13b of the distribution line 13, or to, for example, drinking water outlets located in lavatories.

Preferably, a bypass apparatus 25 is provided for each filtering and/or conditioning and/or purifying device 19, and each bypass apparatus 25 is mounted between the distribution line 13 and the filtering and/or conditioning and/or purifying device 19 for bypassing fluid (e.g., a sanitizing solution, or water containing a sanitizing agent) moving in the distribution line 13 past the filtering and/or conditioning and/or purifying device 19.

Preferably, as illustrated in FIGS. 5 to 14, the bypass apparatus 25 has a body 27 (preferably made from metal) having a first passageway 29 extending through it. An inlet port 31 is formed at an inlet end portion of the first passageway 29 and is connected to the distribution line 13 to receive fluid therefrom.

An outlet port 33 is formed at an outlet end portion of the first passageway 29, and the outlet port 33 of the first passageway 29 is connected to an inlet port 35 of the filtering and/or conditioning and/or purifying device 19 to permit fluid to flow from the outlet port 33 of the first passageway 29 into the inlet port 35 of the filtering and/or conditioning and/or purifying device 19.

The body 27 also has a second passageway 37 extending through it.

An inlet port 39 is formed at an inlet end portion of the second passageway 37, and is connected to an outlet port 41 of the filtering and/or conditioning and/or purifying device 19 to permit fluid to flow from the outlet port 41 of the filtering and/or conditioning and/or purifying device 19 to the inlet port 39 of the second passageway 37.

An outlet port 43 is formed at an outlet end portion of the second passageway 37, and the outlet port 43 of the second passageway 37 is connected to a fluid receiving line (which is a portion of the distribution line 13), to permit fluid to flow from the outlet port 43 of the second passageway 37 into the fluid receiving line. The fluid receiving line receives fluid that has been treated in the filtering and/or conditioning and/or purifying device 19 and leads to an outlet port 17 from the distribution line 13.

Figure 13:
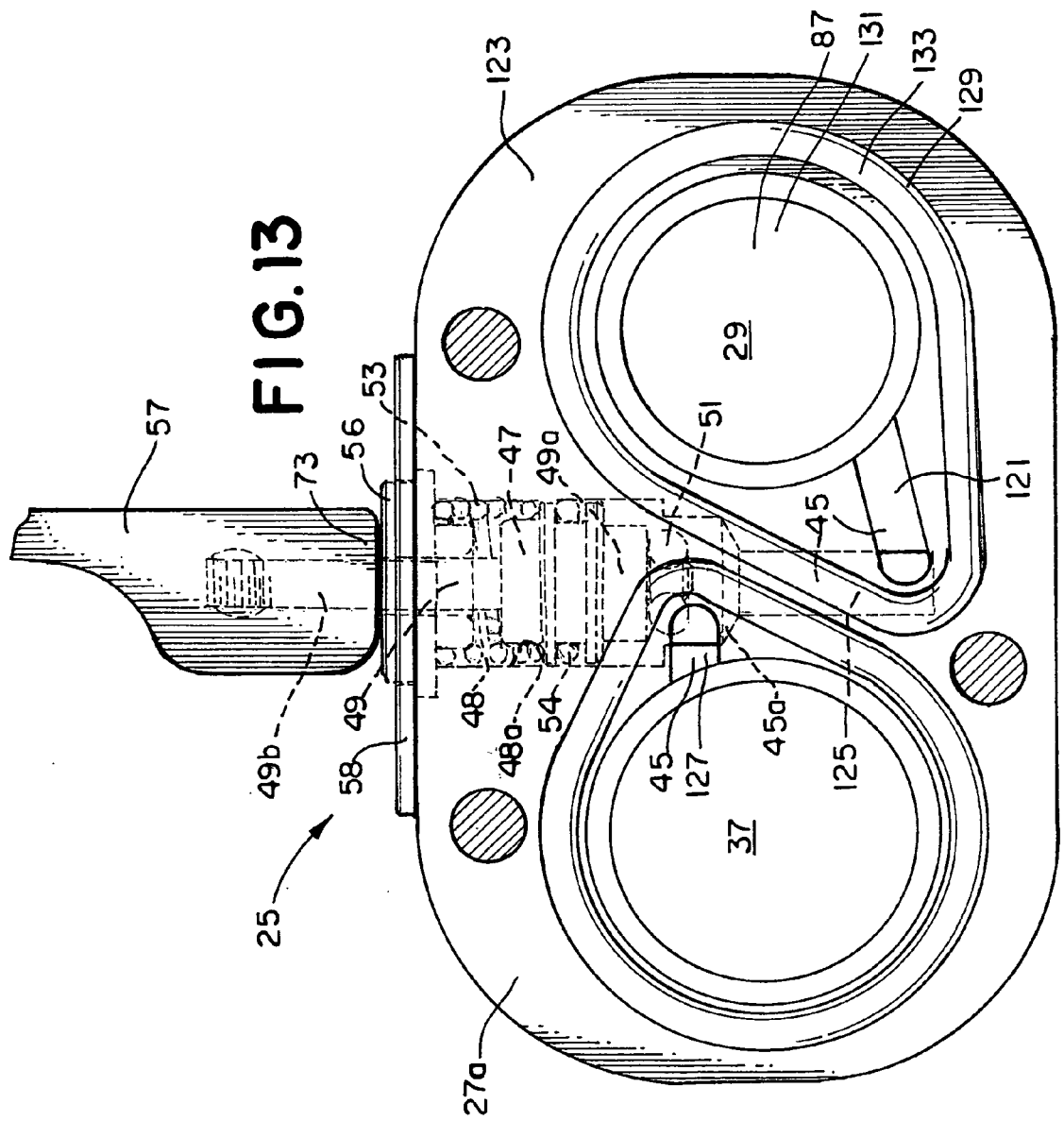
FIG. 13 is a plan view of the second end portion 123 of the first member 27a of the body 27 of the bypass apparatus 25.
Figure 14:
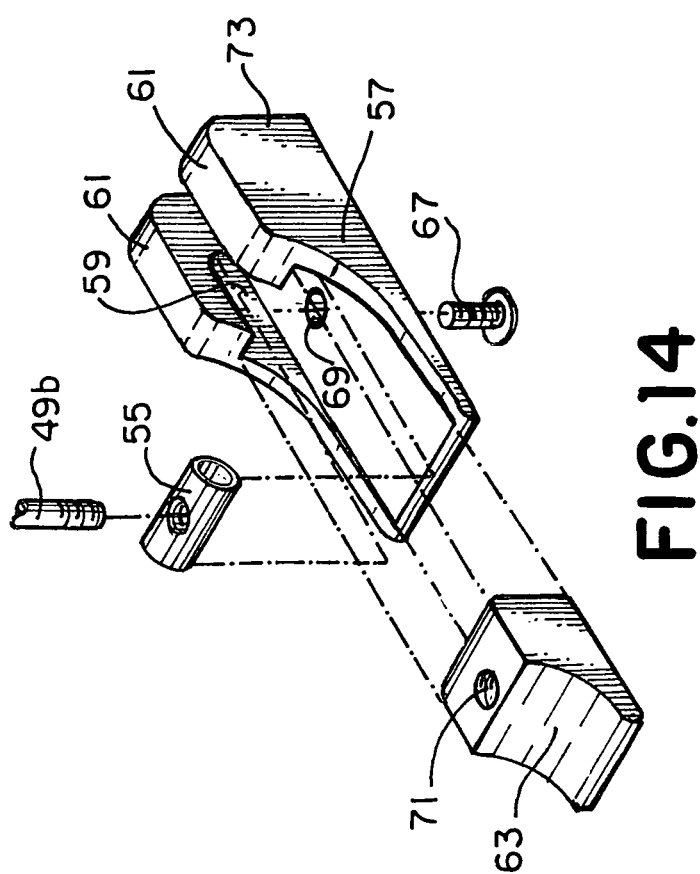
FIG. 14 is an exploded view illustrating a typical handle 57 and the components attached thereto.

Further, as particularly shown in FIG. 13, the body 27 is provided with a third passageway 45 that extends between the first passageway 29 and the second passageway 37.

Figure 10:
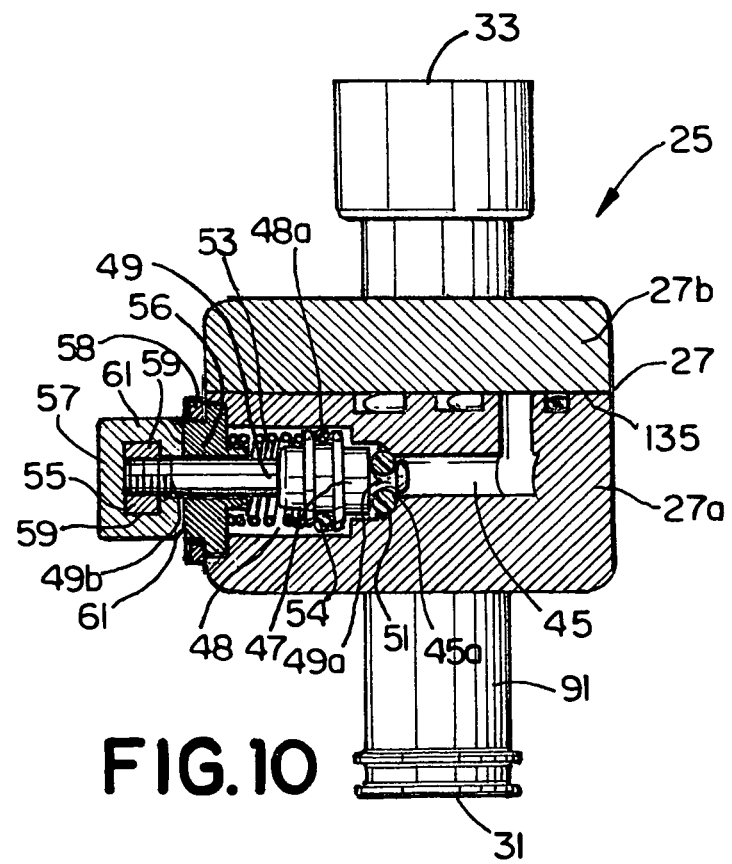
FIG. 10 is a view in cross-section taken along the lines and arrows 10-10 shown in FIG. 9, illustrating the bypass valve 47 in a blocking position in the third passageway 45 of the bypass apparatus 25.
Figure 11:
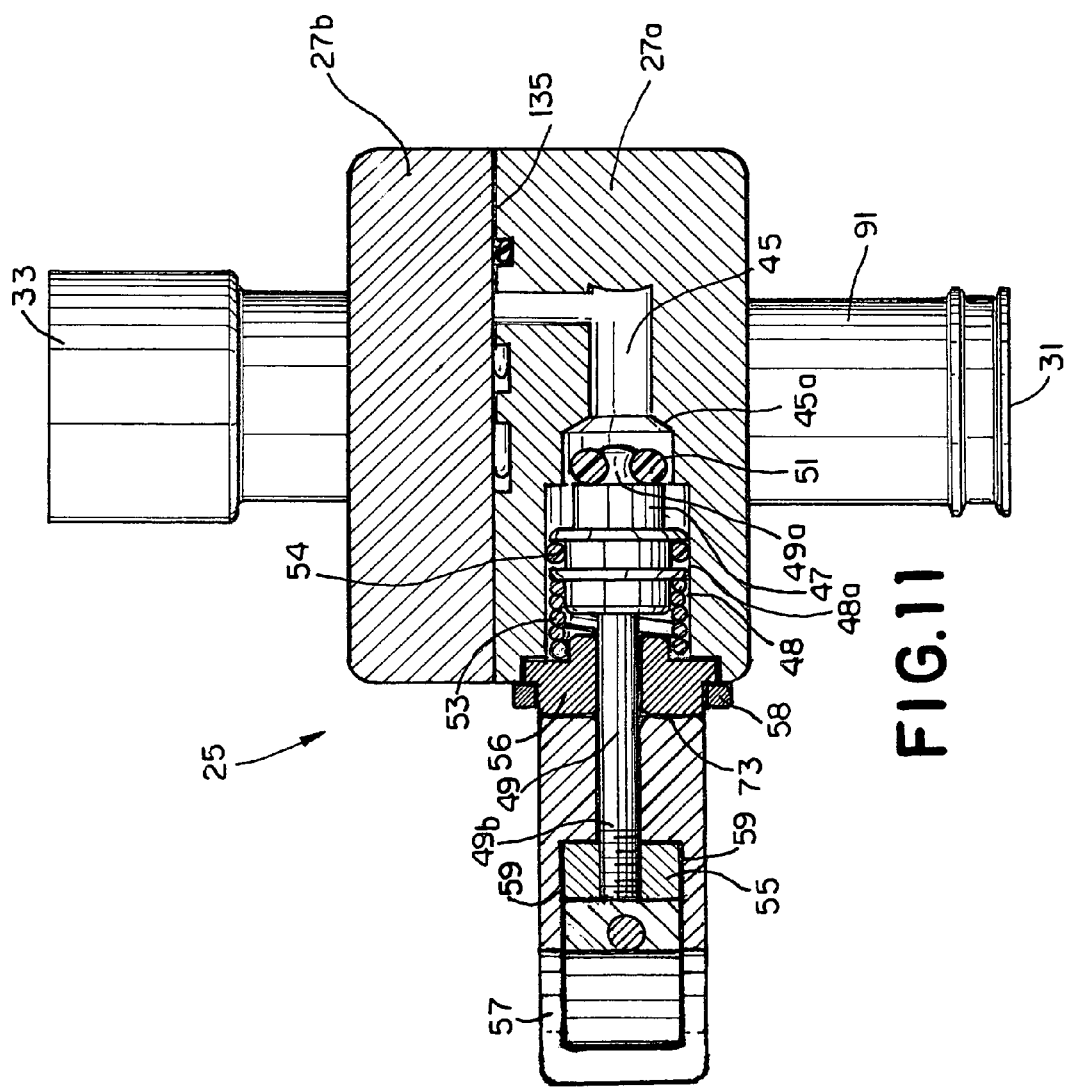
FIG. 11 is a view in cross-section taken along the lines and arrows 10-10 shown in FIG. 9, except that the handle 57 has been rotated outwardly to move the bypass valve 47 into a non-blocking position in the third passageway 45 of the bypass apparatus 25.

Referring to FIGS. 9 to 14, a bypass valve 47 preferably is positioned in the body 27, and the bypass valve 47 has a portion that when positioned in a blocking position in the third passageway 45, as shown in FIG. 10, blocks flow of fluid through the third passageway 45 and that when withdrawn from a blocking position in the third passageway 45, as shown in FIG. 11, opens the third passageway 45 to permit flow of fluid through the passageway 45. Specifically, in one preferred embodiment of the invention, as shown in FIGS. 10, 11, and 13, the bypass valve 45 is positioned in a bore 48 that extends into the body 27 to the third passageway 45. In this preferred embodiment, the bypass valve 47 has a shaft 49 having a first end portion 49a and a second end portion 49b. A sealing member 51 (preferably an o-ring) is mounted on the first end portion 49a of the shaft 49 for sealing between the shaft 49 and a portion of the wall 45a that defines the third passageway 45 to sealingly close the third passageway 45 when the first end portion 49a of the shaft 49 is positioned in a blocking position, as shown in FIG. 10, in the third passageway 45. A biasing member 53 (preferably a spring) is positioned in the bore 48 to engage the shaft 49 for pushing the shaft 49 into a position that closes the third passageway 45. A sealing member 54 (preferably an o-ring) is provided around a portion of the shaft 49 to seal between the shaft 49 and the wall 48a that defines the bore 48. A portion of the shaft 49 rides in a bushing 56 positioned at the entrance of the bore 48, and a plate 58 having an opening therethrough that receives a portion of the bushing 56, is screwed onto the surface of the body 27 to prevent the portion of the bushing 56 contained in the bore 48 from being pulled from the bore 48 and the shaft 49 from being pulled completely from the bore 48.

The second end portion 49b of the shaft 49 preferably is threaded and receives a cylindrical lug 55 having a threaded bore extending therethrough. A handle 57 is pivotally mounted on the second end portion 49b of the shaft 49, specifically around the lug 55. The handle 57 is installed onto the second end portion 49b of shaft 49 around the lug 55 by moving the lug 55 when it is attached to the second end portion 49b of the shaft 49 into the underside of the handle 57 such that the ends of the lug 55 are captured in a pair of recesses 59 formed in the side flanges 61, and a handle locking insert 63 is positioned at the first end portions 65 of the side flanges 61 such that a portion of the handle locking insert 63 is positioned between the first end portions 61. The handle locking insert 63 is secured in place with a threaded bolt 67 that extends through an opening 69 in the handle 57 into a threaded bore 71 formed in the handle locking insert 63, thereby securing the second end portion 49b of the shaft 49 and the lug 55 secured thereto to the handle 57.

The handle 57 has a cam 73 formed thereon, and when the handle 57 is positioned in a first position, as shown in FIG. 10, the biasing member 53 pushes the shaft 49 into a position that closes the third passageway 45, and when the handle 57 is positioned in a second position, as shown in FIG. 11, by pivoting the handle 57 on its cam 73, the first end portion 49a of the shaft 49 is pulled into a position that opens the third passageway 45 by withdrawing the first end portion 49a of the shaft 49 from a blocking position in the third passageway 45.

Alternatively, other types of actuators may be used to open and close the third passageway 45, and these actuators include solenoids (e.g., electrical solenoids and pneumatic solenoids), and other mechanical and electromechanical devices known in the art. Preferably, the actuators are of a type that may be controlled either locally (e.g., on site) or remotely via electrical connections or via wireless transmissions to receivers connected to the actuators for receiving wireless signals and triggering the actuators to open and close the third passageway 45. Wireless actuating and monitoring of the bypass valve(s) 47 may be controlled either by personnel or by computer or other programmer actuator/controllers. An example of an alternative actuator is shown schematically in FIG. 7, where a solenoid mechanism 75 is linked to the bypass valve 47 for opening and closing the third passageway 45. Preferably, the solenoid mechanism 75 is of the type that may be controlled remotely. Further, the solenoid mechanism 75 preferably has a receiver for receiving a wireless signal and triggering the solenoid mechanism 75 to move the shaft 49 into a blocking position in the third passageway 45 when it is not desired to bypass the filtering and/or conditioning and/or purifying device 19 and to move the shaft 49 into a non-blocking position in the third passageway 45 to permit fluid to flow through the third passageway 45 when it is desired to bypass fluid past the filtering and/or conditioning and/or purifying device 19.

The actuators may be configured (e.g. via wire connections or via wireless transmissions to wireless receivers connected to the actuators) to permit each bypass valve 47 to be opened or closed individually and/or opened or closed as a group. For example, in the aircraft embodiment of the invention illustrated in the drawings, either single or multiple bypass valves 47 may be actuated and controlled remotely within or outside the aircraft, or locally within a given galley, lavatory, or fountain area.

Preferably, each actuator is wired to or wirelessly connected to (e.g., connected via a signal transmitted from the actuator to a remote receiver) a locally and/or remotely positioned LED light or other signaling indicator 76 to provide an indication of proper operation and positioning of each of the bypass valves 47. For example, in the aircraft embodiment of the invention illustrated in the drawings, the indicator(s) 76 may be located locally within given areas of the aircraft or outside the aircraft.

The potable water distribution system 11 may further include a water supply 77 that is fed into the distribution line 13. In the embodiment of the invention illustrated in the drawings with respect to use of the inventive potable water distribution system 11 in aircraft, the water supply 77 comprises a tank of water, as shown in FIG. 1. However, in general, the water supply 77 may comprise all types of water sources from which water may be fed into the distribution line 13. Such water supplies 77 include tanks of water and municipal water lines.

In a particularly preferred embodiment of the invention, the water supply 77 comprises water containing a sanitizing agent, where the water containing the sanitizing agent is effective to sanitize against undesirable contaminants it may encounter when introduced into the distribution line 13. The sanitizing agent preferably comprises chlorine, and preferably free chlorine, or an organic sanitizing agent or a combined chlorine residual. The sanitizing agent is used to cleanse and sanitize the distribution line 13, and in some embodiments of the invention, to cleanse and sanitize the distribution line 13 and the water supply 77. In particular, the sanitizing agent is used to reduce/remove undesirable contaminants such as bacteria, viruses, molds, fungus, mildew, algae, and other microorganisms and plants. Preferably, the sanitizing agent is present in the water supply 77 in the range of about 1 part per million to about 2 parts per million.

In other preferred embodiments, the sanitizing agent may be introduced into water from the water supply 77 as the water is moved into the distribution line 13 to produce a sanitizing solution having sanitizing agent present preferably in a range of about 1 part per million to about 150 parts per million. The concentration of the sanitizing agent in the sanitizing solution depends on the method of sanitizing chosen to be practiced. This may be accomplished by metering into the water as it enters the distribution line 13 a sanitizing agent, either in dry or liquid form, via a feed line connected to the first end portion of the distribution line 13 near its inlet port 15. For example, for sanitizing during a flight, a sanitizing agent may be mixed into water from the water supply tank 77 as water from the water supply tank 77 is fed into the distribution line 13 to form a sanitizing solution having preferably 1 to 10 parts per million sanitizing agent, and more preferably 3 to 10 parts per million sanitizing agent, the sanitizing solution being flushed from the distribution line 13 to waste after the sanitizing steps having been completed. Further, for example, for on-ground sanitizing of a potable water distribution system 11 of an aircraft, a sanitizing agent may be mixed into water from a water supply 77 to form a sanitizing solution preferably having 50 to 150 parts per million sanitizing agent (which fights against biofilm similar film formation) that is fed into the distribution line 13, the sanitizing solution being flushed from the system 11 after an appropriate period of soaking of the distribution line 13 with the sanitizing solution has occurred.

In another embodiment of the invention, a sanitizing solution effective to sanitize the potable water distribution system 11 may be introduced to the distribution line 13 separately from the water supply 77. In this embodiment, the sanitizing solution may comprise water containing a sanitizing agent as described above, or it may be some other cleansing/sanitizing product that is easily flushed through the distribution line 13 after sanitizing with it has been completed. In this embodiment, the sanitizing solution may be introduced into the distribution line 13 using a pump to pump sanitizing solution from a sanitizing solution supply through a flow line into the distribution line 13. Preferably, the concentration of the sanitizing agent in the sanitizing solution is in a range of about 1 to 150 parts per million. Again, the concentration of the sanitizing agent in the sanitizing solution depends on the method of sanitizing chosen to be practiced. For example, for sanitizing during a flight, a sanitizing agent may be mixed into water from the water supply tank 77 to form a sanitizing solution having preferably 1 to 10 parts per million sanitizing agent, and more preferably 3 to 10 parts per million sanitizing agent, the sanitizing solution being flushed from the distribution line 13 to waste after the sanitizing steps having been completed. Further, for example, for on-ground sanitizing of a potable water distribution system 11 an aircraft, a sanitizing agent may be mixed into water from a water supply 77 to form a sanitizing solution preferably having 50 to 150 parts per million sanitizing agent (which fights against biofilm or other film formation), the sanitizing solution being flushed from the system 11 after a 2 hour or more soaking of the distribution line 13.

Similarly, in another embodiment, a sanitizing agent may be metered directly into the water supply 77 (e.g., a water supply tank 77 in an aircraft) to obtain a water supply 77 having a concentration of preferably 1 to 2 parts per million sanitizing agent.

Also, preferably, the potable water distribution system 11 has means 79 for moving fluid into and through the distribution line 13. In the embodiment of the invention illustrated in the drawings, and specifically illustrated schematically in FIG. 1, with respect to use of the inventive potable water distribution system 11 in aircraft, such means 79 may be the pressurized air system of the aircraft tied into the potable water distribution system 11. Pressurized air from the pressurized air system of the aircraft may be feed into the water supply tank 77 via a pressurized air line 79a to pressurize the water supply line 77 to push fluid from the water supply tank 77 into the distribution line 13. Alternatively, such means 79 in aircraft may be a fluid flow line from the water supply tank 77 and a pump connected thereto for pumping fluid from the water supply tank 77 to the distribution line 13.

In general, examples of such means 79 include a fluid flow line from a water supply tank 77 and a pump connected thereto for pumping water from the water supply tank 77 to the distribution line 13, a fluid flow line extending from an elevated water supply tank 77 for moving water from the elevated water supply tank 77 to the distribution line 13 by gravity, and fittings for connecting the distribution line 13 to a municipal water line to permit the pressurized water in the municipal water line to move into the distribution line 13.

Figure 12:
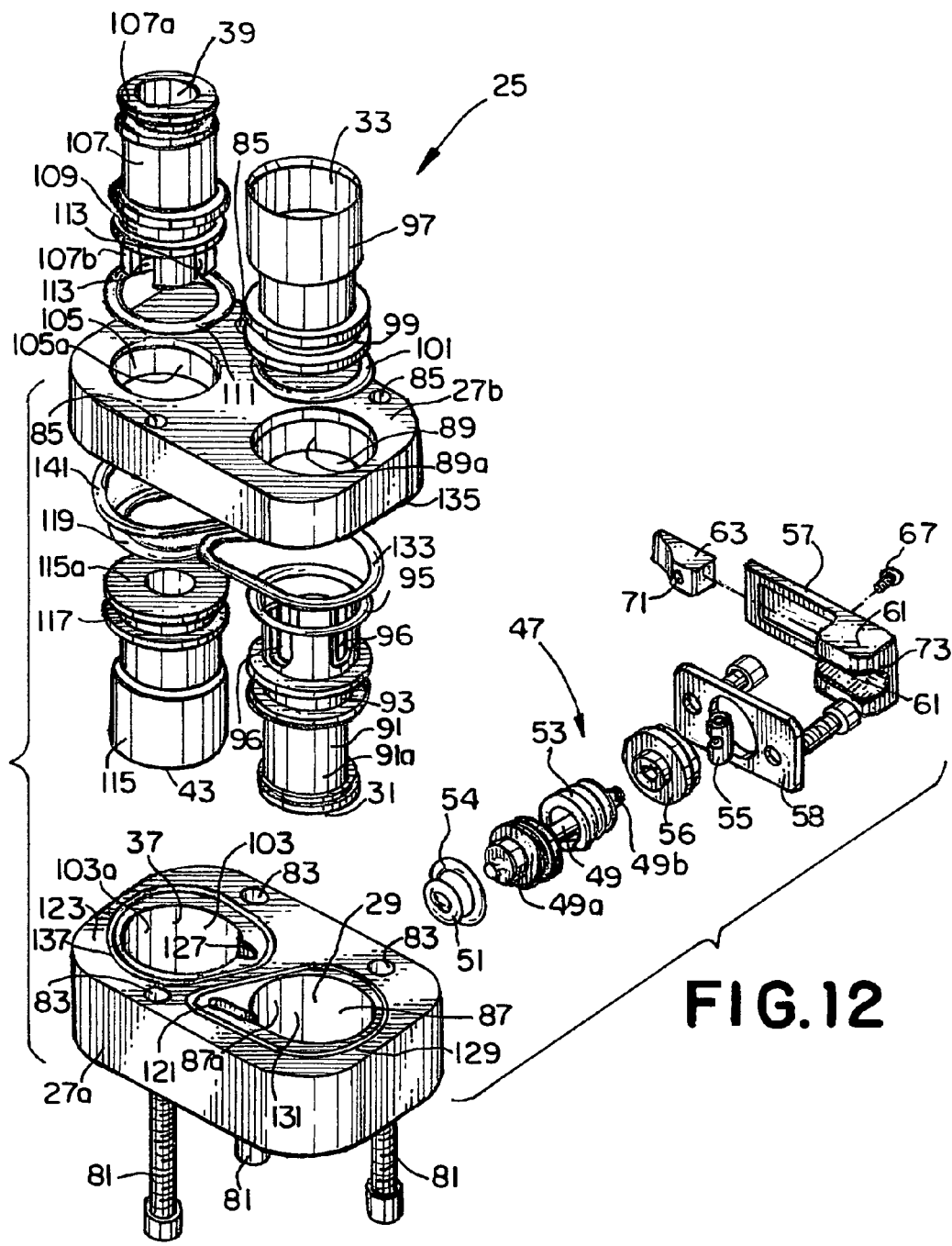
FIG. 12 is an exploded view of the bypass apparatus 25 shown in FIG. 9.

Referring to the bypass apparatus 25, as shown in FIGS. 5 to 13, its body 27 preferably is machined from a metal such as stainless steel or aluminum preferably coated and sealed with a hard aluminum oxide coating for scratch resistance and long life. Preferably, the body 27 includes a first member 27a and a second member 27b, which, as shown in FIG. 12, are held together by threaded bolts 81 that extend through bores 83 formed in and extending through the first member 27a and into aligned threaded bores 85 formed in the second member 27b.

The first passageway 29 preferably is defined by a bore 87 formed in and extending through the first member 27a of the body 27 and a bore 89 formed in and extending through the second member 27b of the body 27, the bores 87 and 89 being in alignment with one another.

An inlet tube 91 preferably is positioned in the bore 87 of the first member 27a of the body 27, and is provided with an annular recess 93 around its circumference that receives a sealing member 95 (preferably an o-ring) for sealing between the inlet tube 91 and the wall 87a that defines the bore 87 in the first member 27a of the body 27. The first end portion 91a of the inlet tube 91 in configured to connect to the distribution line 13. The second end portion 91b of the inlet tube 91 preferably is provided with four side openings 96, preferably in the shape of arches, in the wall of the inlet tube 91 to permit fluid to flow from the first passageway 29 into and through the third passageway 45 when the bypass valve 47 is open.

The end of the inlet tube 91 at its second end portion 91b preferably abuts against the end of the first end portion 97a of an outlet tube 97 preferably positioned in the bore 89 of the second member 27b of the body 27. The outlet tube 97 is provided with an annular recess 99 around its circumference that receives a sealing member 101 (preferably an o-ring) for sealing between the outlet tube 97 and the wall 89a that defines the bore 89 in the second member 27b of the body 27. Preferably, the inside surface of the outlet tube 97 is configured to receive the inlet port 35 of the filtering and/or conditioning and/or purifying device 19.

The second passageway 37 preferably is defined by a bore 103 formed in and extending through the first member 27a of the body 27 and a bore 105 formed in and extending through the second member 27b of the body 27, the bores 103 and 105 being in alignment with one another.

An inlet tube 107 preferably is positioned in the bore 105 of the second member 27b of the body 27, and is provided with an annular recess 109 around its circumference that receives a sealing member 111 (preferably an o-ring) for sealing between the inlet tube 107 and the wall 105a that defines the bore 105 in the second member 27b of the body 27. The first end portion 107a of the inlet tube 107 is configured to connect to the outlet port 41 of the filtering and/or conditioning and/or purifying device 19. The second end portion 107b of the inlet tube 107 preferably is provided with four side openings 113, preferably in the shape of arches, in the wall of the inlet tube 107 to permit fluid to flow from the third passageway 45 through the openings 113 into the second passageway 37 when the bypass valve 47 is open.

The end of the inlet tube 107 at its second end portion 107b preferably abuts against the end of the first end portion 115a of an outlet tube 115 preferably positioned in the bore 103 of the first member 27a of the body 27. The outlet tube 115 is provided with an annular recess 117 around its circumference that receives a sealing member 119 (preferably an o-ring) for sealing between the outlet tube 115 and the wall 103a that defines the bore 103 in the first member 27a of the body 27. Preferably, the inside surface of the outlet tube 115 is configured to connect to the distribution line 13.

As shown in FIGS. 12 and 13, a slot 121 is formed in the surface of the second end portion 123 of the first member 27a next to and in communication with the bore 87 that defines the portion of the first passageway 29 in the first member 27a. This slot 121 is the first of three portions of the third passageway 45. The slot 121 connects to and communicates with the second portion 125 (shown in FIG. 13) of the third passageway 45 when the bypass valve 47 is open, the second portion 125 of the third passageway 45 being formed by a portion of the bore 48. A slot 127 also is formed in the surface of the first end portion 123 of the first member 27a next to and in communication with the bore 103 that defines the portion of the second passageway 37 in the first member 27a. This slot 127 is the third portion of the third passageway 45. The slot 127 connects to and communicates with the second portion 125 of the third passageway 45 when the bypass valve 47 is open. Accordingly, when the bypass valve 47 is open, fluid may bypass the filtering and/or conditioning and/or purifying device 19 by moving from the inlet tube 91 to the slot 121 through the openings 96 formed in the inlet tube 91, from the slot 121 to the second portion 125 of the third passageway 45, from the second portion 125 of the third passageway 45 to the slot 127, from the slot 127 into the outlet tube 115 through the openings 113, and then through the outlet tube 115 to the distribution line 13.

The surface of the second end portion 123 of the first member 27*a* of the body 27 is provided with a first groove 129 that surrounds the second end portion 131 of the bore 87 and the slot 121 connected thereto. The groove 129 receives a sealing member 133 (preferably an o-ring) for sealing between the second end portion 123 of the first member 27*a* and the surface of the first end portion 135 of the second member 27*b*.

Likewise, the surface of the second end portion 123 of the first member 27*a* of the body 27 is provided with a second groove 137 that surrounds the second end portion 139 of the bore 103 and the slot 127 connected thereto. The groove 137 receives a sealing member 141 (preferably an o-ring) for sealing between the second end portion 123 of the first member 27*a* and the surface of the first end portion 135 of the second member 27*b*.

Figure 15:
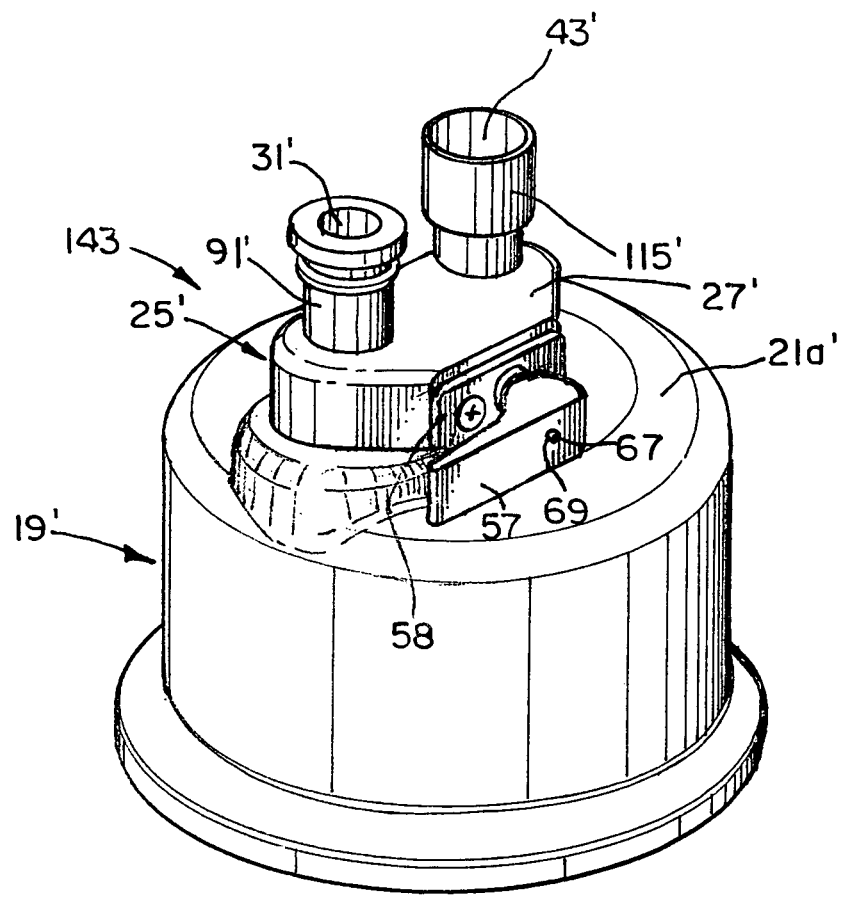
FIG. 15 is a view in perspective illustrating an alternative embodiment of the invention.
Figure 17:
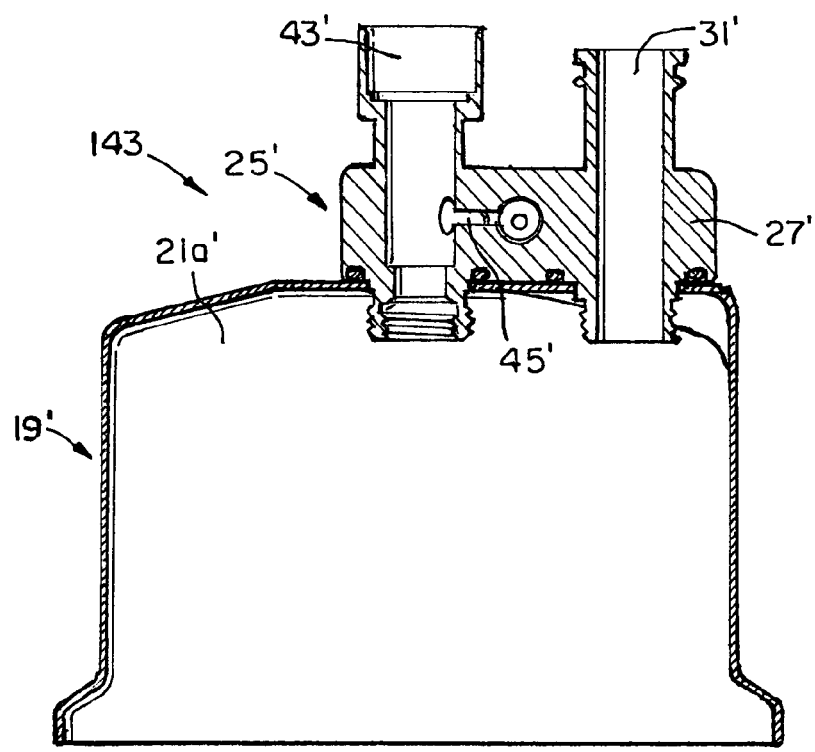
FIG. 17 is a view in side elevation of the alternative embodiment of the invention shown in FIG. 15, with the bypass apparatus portion 25' of the combined device 143 being shown in cross-section.
Figure 16:
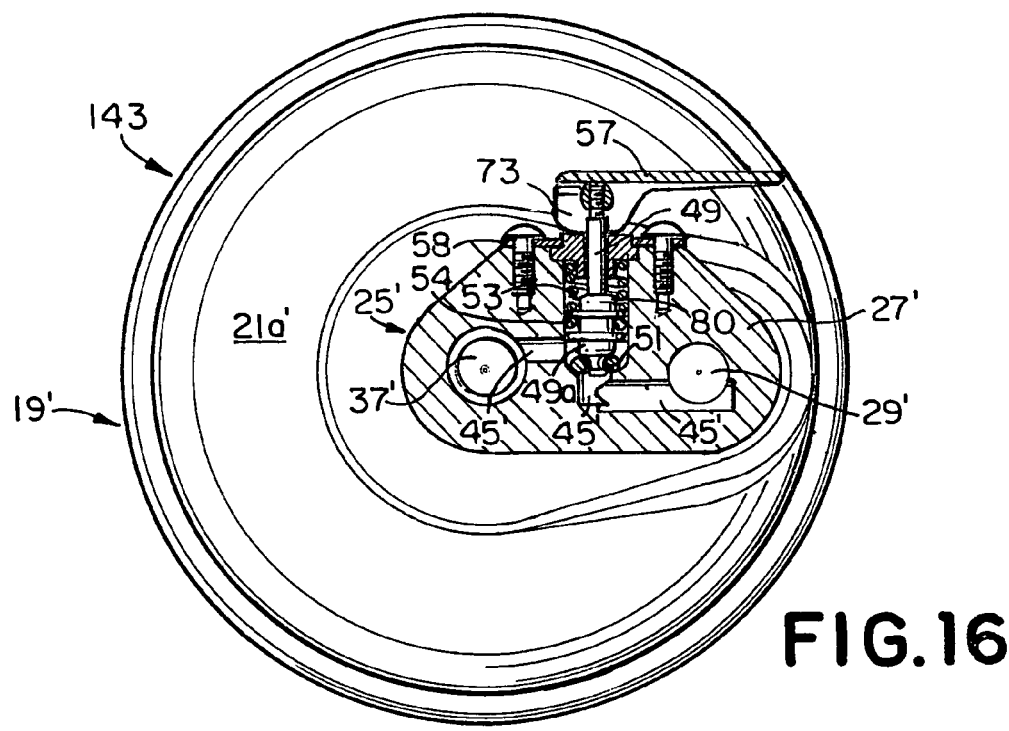
FIG. 16 is a top plan view of the alternative embodiment of the invention shown in FIG. 15, with the bypass apparatus portion 25' of the combined device 143 being shown in cross-section.

Referring to the bypass apparatus 25 and the filtering and/or conditioning and/or purifying device 19 described above, in a preferred alternative embodiment, they may be integrally connected to one another as illustrated in FIGS. 15 to 17 forming a combined device 143. In this embodiment, the body 27' of the bypass apparatus 25' is integrally connected to a wall 21*a'* of the pressure vessel 21' of the filtering and/or conditioning and/or purifying device 19'. The component parts of the bypass apparatus portion of the combined device 143 are the same or substantially the same as the component parts of the bypass apparatus 25, and the component parts of the filtering and/or conditioning and/or purifying device portion of the combined device 143 are the same or substantially the same as the component of the filtering and/or conditioning and/or purifying device 19. Accordingly, components in the combined device 143 that are the same as components in the bypass apparatus 25 and the filtering and/or conditioning and/or purifying device 19 have been given the same reference numbers, and components in the combined device 143 that are substantially the same as components in the bypass apparatus 25 and the filtering and/or conditioning and/or purifying device 19 have been identified with the same reference numbers followed by a single quote mark (e.g., a prime). Regarding the bore that forms the portion of the third passageway 45' between the first passageway 29' and the portion of the third passageway 45' formed from the bore 80, and the bore that forms the portion of the third passageway 45' between the second passageway 37' and the portion of the third passageway 45' formed from the bore 80, they may be formed by drilling, followed by filling the drill hole between the outer surface of the bypass portion of the combined device 143 and the first passageway 29' with a plug having a sealing member and by filling the drill hole between the outer surface of the bypass portion of the combined device 143 and the second passageway 37' with a plug having a sealing member. Alternatively, the bypass portion of the combined device 143 may comprise a first member 27*a'* and a second member 27*b'* bolted together, with slots 121' and 127' and grooves 129 and 137 formed in the first member 27*a'* and sealing members 133 and 141 positioned in the grooves 129 and 137 sandwiched between the first member 27*a'* and the second member 27*b'* in a fashion similar to the body 27 of the bypass apparatus 25.

In use, the potable water distribution system 11 provides potable water for consumption by its users, as well facilitating sanitizing of the system 11.

When fluid (e.g., water or water containing a sanitizing agent) flows through the distribution line 13 when the bypass valve 47 is closed, fluid from the distribution line 13 flows into the inlet port 31 of the first passageway 29, through the first passageway 29, and into the filtering and/or conditioning and/or purifying device 19 from the outlet port 33 of the first passageway 29. Then, in the filtering and/or conditioning and/or purifying device 19, fluid moves through the cartridge 23 of the filtering and/or conditioning and/or purifying device 19 to filter and/or condition and/or purify the fluid to obtain potable water which is discharged form the outlet port 41 of the filtering and/or conditioning and/or purifying device 19 into and through the second passageway 37 to the distribution line 13 downstream of the filtering and/or conditioning and/or purifying device 19 to an outlet port 17.

When it is desired to sanitize, the bypass valve 47 is activated to open the bypass valve 47 to allow sanitizing solution to flow into the first passageway 29 from the distribution line 13, and from the first passageway 29 into an through the third passageway 45 to the second passageway 37, and then from the second passageway 37 through its outlet port 43 into the distribution line 13 downstream of the filtering and/or conditioning and/or purifying device 19 to an outlet port 17, thereby exposing the distribution line 13 downstream of the filtering and/or conditioning and/or purifying device 19 to the sanitizing solution.

The portion of the distribution line 13 downstream of the filtering and/or conditioning and/or purifying device 19 is not exposed to a sufficient amount of sanitizing solution to effectively sanitize this portion of the distribution line 13 when water having, for example, 10 parts per million of a sanitizing agent in it moves through the distribution line 13 when the bypass valve is closed, because the filtering and/or conditioning and/or purifying device 19 filters out much, if not all, of the sanitizing agent leaving only potable water moving from the filtering and/or conditioning and/or purifying device 19 into this portion of the distribution system 13.

However, if a sanitizing solution, having an amount of sanitizing agent in it that is higher than what the cartridge 23 of the filtering and/or conditioning and/or purifying device 19 is able to filter out, is moved through the filtering and/or conditioning and/or purifying device 19 rather than bypassed around it, then it is possible to sanitize the portion of the distribution line 13 downstream of the filtering and/or conditioning and/or purifying device 19 with a sanitizing solution passed through the filtering and/or conditioning and/or purifying device 19 if the concentration of sanitizing agent moving through the filtering and/or conditioning and/or purifying device 19 is sufficiently high enough to effectively sanitize this portion of the distribution line 13. When this happens, after the distribution line 13 is flushed and drained, the cartridge 23 may be removed and replaced with a replacement cartridge 23, or, the entire filtering and/or conditioning and/or purifying device 19, if disposable, may be removed and replaced with a replacement filtering and/or conditioning and/or purifying device 19.

In one preferred method of providing potable water using the potable water distribution system 11, water or water containing a sanitizing agent is flowed into the distribution line 13 as needed. If water containing the sanitizing agent is used, the sanitizing agent is present in the water in an amount effective to sanitize against undesirable contaminants it may encounter in the distribution line 13, but at a concentration level not higher than what may be effectively treated in the filtering and/or conditioning and/or purifying device 19. The water or the water containing the sanitizing agent is flowed from the distribution line 13 into the filtering and/or conditioning and/or purifying device 19 to filter and/or condition and/or purify water containing the sanitizing agent introduced into the device 19 to produce potable water. Then, potable water is flowed from the filtering and/or conditioning and/or purifying device 19 into the distribution line 13 downstream of the filtering and/or conditioning and/or purifying device 19 to an outlet port 17 of the distribution line 13 when it is desired to sanitize the distribution line 13, the bypass valve 47 in the bypass apparatus 25 is activated to enable a sanitizing solution (e.g., water containing a sanitizing agent, having, for example, 2 parts per million of sanitizing agent, fed directly from a water supply 77, or water containing a high concentration of sanitizing agent such as 100 parts per million (or some other sanitizing solution) fed into the distribution line 13 from a sanitizing solution supply) to bypass the filtering and/or conditioning and/or purifying device 19 and flow into the distribution line 13 downstream of the filtering and/or conditioning and/or purifying device 19 to an outlet port 17 of the distribution line 13. While the bypass valve 47 is open, the sanitizing solution is flowed from the distribution line 13 upstream of the filtering and/or conditioning and/or purifying device 19 past the filtering and/or conditioning and/or purifying device 19 into the distribution line 13 downstream of the filtering and/or conditioning and/or purifying device 19 to an outlet port 17 of the distribution line 13. Next, the sanitizing solution is allowed to remain in the distribution line 13 for a desired period of time (e.g., preferably from 2 minute to 2 hours or more, and in one embodiment preferably from 2 minutes to 10 minutes) to sanitize the distribution line 13, particularly the distribution line 13 downstream of the filtering and/or conditioning and/or purifying device 19. Next, the distribution line 13 is flushed by moving fluid (e.g., water (or water containing a sanitizing agent at a concentration level that may effectively be treated by the filtering and/or conditioning and/or purifying device 19) from the water supply 77), through the distribution line 13, and out each outlet port 17 of the distribution line 13, followed by deactivating the bypass valve 47 of the bypass apparatus 25 to close the bypass valve 47 to stop bypassing of the filtering and/or conditioning and/or purifying device 19. Or, after allowing the sanitizing solution to remain in the distribution line 13 for a desired period of time, the bypass valve 47 may be deactivated to close the bypass valve 47 to stop bypassing of the filtering and/or conditioning and/or purifying device 19, followed by flushing the distribution line 13 by moving fluid (e.g., water (or water containing a sanitizing agent at a concentration that may effectively be treated by the filtering and/or conditioning and/or purifying device 19) from the water supply 77, through the distribution line 13, and out each outlet port 17 of the distribution line 13. After the sanitizing steps have been completed, water, or water containing a sanitizing agent at a concentration that may be effectively treated by the filtering and/or conditioning and/or purifying device 19, may be flowed as needed into the distribution line 13 and from the distribution line 13 into the filtering and/or conditioning and/or purifying device 19 to produce potable water, followed by potable water being flowed from the filtering and/or conditioning and/or purifying device 19 into the distribution line 13 downstream of the filtering and/or conditioning and/or purifying device 19 to an outlet port 17 of the distribution line 13.

In accordance with invention, and particularly in accordance with the method set out immediately above this paragraph, in-flight periodic sterilization of an aircraft potable water distribution system 11 while airborne is provided for. For example, long range flights on larger aircraft of over 20 hours (such as flights from Hong Kong to New York, for example) have now been made and may become more frequent. Distribution system sterilization using low concentrations of chlorine or other sterilizing solutions during extended flights may take place in accordance with the invention, providing higher reassurance of safe drinking water throughout the flight. The inventive process may be carried out sequentially or throughout the distribution system 11. A water supply tank 77 storing the water supply for the aircraft may be provided with a sanitizing agent, the sanitizing agent being effective to sanitize against undesirable contaminants it may encounter in the distribution line 13, and being at a concentration in the water supply tank 77 for the aircraft that may effectively be treated by the filtering and/or conditioning and/or purifying device 19, and such water from the water supply tank 77 may serve two purposes—(1) the source of what is feed into the filtering and/or conditioning and/or purifying device 19 to produce potable water to be transmitted therefrom to the outlet ports 17 for use by aircraft crew and passengers, and (2) the source of the sanitizing solution that is transmitted to the distribution line 13 downstream of the filtering and/or conditioning and/or purifying device 19 by opening the bypass valve 47 to bypass the filtering and/or conditioning and/or purifying device 19. Alternatively, rather than merely using the water supply 77 if it contains a sanitizing agent, a highly concentrated sanitizing solution (e.g., one having 100 parts per million sanitizing agent) may be fed into the distribution line 13 from an independent sanitizing solution supply to be transmitted to the distribution line 13 downstream of the filtering and/or conditioning and/or purifying device 19 by opening the bypass valve 47 to bypass the filtering and/or conditioning and/or purifying device 19 to sanitize the distribution line 13 downstream of the filtering and/or conditioning and/or purifying device 19. Then, the distribution line 13 may be flushed and the bypass valve 42 closed to permit water, or water containing a sanitizing agent at a concentration that may be effectively treated by the filtering and/or conditioning and/or purifying device 19, from the water supply tank 77 to again flow into the distribution line 13, to and through the filtering and/or conditioning and/or purifying device 19, and then to the water outlets 17 of the distribution line 13 as potable water for use by aircraft crew and passengers. Accordingly, a relatively small quantity of high concentration sterilizing solution may be used to cleanse and reassure safe drinking water throughout flights, without encumbering the aircraft with otherwise complicated, heavy chlorine, ozone, UV or other equipment.

In one preferred method of sanitizing the potable water distribution system 11, the bypass valve 47 of the bypass apparatus 25 is activated to open the bypass valve 47 to bypass fluid in the distribution line 13 past the filtering and/or conditioning and/or purifying device 19. Next, the distribution line 13 is filled throughout with a sanitizing solution, such as water containing a sanitizing agent, and the sanitizing solution is allowed to remain in the distribution line 13 for a desired period of time (e.g., preferably 2 minutes to 2 hours or more). After the sanitizing solution has been allowed to remain in the distribution line 13 for the desired period of time, the distribution line 13 is flushed (preferably with water or water containing sanitizing agent at a concentration that may effectively be treated by the filtering and/or conditioning and/or purifying device 19), and the bypass valve 47 of the bypass apparatus 25 is deactivated to close the bypass valve 47 to stop fluid from the distribution line 13 from bypassing the filtering and/or conditioning and/or purifying device 19. In this preferred method, the step of deactivating the bypass valve 47 to close the bypass valve 47 to stop fluid from the distribution line 13 from bypassing the filtering and/or conditioning and/or purifying device 19 may occur before or after the flushing step.

In another preferred method of sanitizing the potable water distribution system 11, the bypass valve 47 of the bypass apparatus 25 is activated to open the bypass valve 47 to bypass fluid in the water distribution line 13 past the filtering and/or conditioning and/or purifying device 19. Next, the water distribution line 13 is filled throughout with a sanitizing solution. The sanitizing solution is allowed to remain in the water distribution line 13 for a desired period of time (e.g., preferably 2 hours or more). Then, the water distribution line 13 is flushed and drained, and the filtering and/or conditioning and/or purifying element (e.g., the cartridge 23) from the filtering and/or conditioning and/or purifying device 19 is removed and replaced with a replacement filtering and/or conditioning and/or purifying element. In this preferred method, the bypass valve 47 of the bypass apparatus 25 is deactivated to close the bypass valve 47 prior to introducing water (or water containing a sanitizing agent at a concentration that may effectively be treated by the filtering and/or conditioning and/or purifying device 19) to the water distribution line 13 after the replacement filtering and/or conditioning and/or purifying element has been installed. In an alternative method to the method of sanitizing the potable water distribution system 11 immediately set out above, the same steps are followed, except rather than removing the filtering and/or conditioning and/or purifying element from the filtering and/or conditioning and/or purifying device 19 and installing a replacement filtering and/or conditioning and/or purifying element into the filtering and/or conditioning and/or purifying device 19, a disposable filtering and/or conditioning and/or purifying device 19 is used, and at the end of the method the entire disposable filtering and/or conditioning and/or purifying device 19 is removed and replace with a replacement disposable filtering and/or conditioning and/or purifying device 19.

In still another preferred method of sanitizing a potable water distribution system having a water distribution line 13 having an inlet port 15 and at least one water outlet port 17, and having a filtering and/or conditioning and/or purifying device 19 mounted along the water distribution line 13 for filtering and/or conditioning and/or purifying water received from the water distribution line 13 before said water exits the potable water distribution system through a water outlet port 17 of the water distribution line 13, the distribution line 13 is filled throughout with a sanitizing solution effective to sanitize against undesirable contaminants it may encounter when introduced into distribution line 13. The sanitizing solution is allowed to remain in the water distribution line 13 for a desired period of time (e.g., preferably 2 hours or more). Then, the water distribution line 13 is flushed and drained, and the filtering and/or conditioning and/or purifying element (e.g., the cartridge 23) from the filtering and/or conditioning and/or purifying device 19 is removed and replaced with a replacement filtering and/or conditioning and/or purifying element. In an alternative method to the method of sanitizing the potable water distribution system 11 immediately set out above, the same steps are followed, except rather than removing the filtering and/or conditioning and/or purifying element from the filtering and/or conditioning and/or purifying device 19 and installing a replacement filtering and/or conditioning and/or purifying element into the filtering and/or conditioning and/or purifying device 19, a disposable filtering and/or conditioning and/or purifying device 19 is used, and at the end of the method the entire disposable filtering and/or conditioning and/or purifying device 19 is removed and replace with a replacement disposable filtering and/or conditioning and/or purifying device 19.

In one preferred embodiment of the invention, a bypass valve 45 is mounted within the horizontal profile of a filtering and/or conditioning and/or purifying device 19, such as General Ecology's Versa-Pure AC3 filtration and purification system. This valve 45, when in open position, allows bypass of sterilizing chlorine or other solutions while at the same time allowing diffusion into both the inlet and outlet of the filtering and/or conditioning and/or purifying device 19 without removing the cartridge 23. When in closed position, the valve 45 prevents bypass but allows desired forward flow from the exterior to the interior of the cartridge 23, such as General Ecology's Versa-Pure cartridge, thereby providing the desired purification and/or microfiltration action. The valve 45 is normally closed, preventing by-pass of fluid. Positive actuation compressing the biasing member 53 is used to allow by-pass to occur.

Potable water may be uploaded from many different locations with possible wide variations in water safety and quality. Aircraft equipped with bypass valves 47 and with relatively small quantity of concentrated chlorine or other solutions, may dilute large quantities of unsafe water with concentrated chlorine to assure potability.

Water occasionally is drained from aircraft during periods of non-use such as overnight in cold climates. Typically, the same distribution lines used to drain aircraft are used to upload potable water for the next flight thereby potentially inoculating the water distribution system 11 with microorganisms. An on-board, easily activated sterilizing sanitizing solution may be employed in accordance with the invention to assure a sanitary water distribution system 11 immediately before or during filling with potable water, thereby eliminating short interval/overnight contamination concerns about water safety.

Use of the bypass feature to bypass around filtering and/or conditioning and/or purifying devices 19 permits the distribution lines 13 downstream of the filtering and/or conditioning and/or purifying devices 19 to be selectively sanitized both on long flights and during ground maintenance intervals. That is, if it is desired to sanitize at a particular time, one or some, but not all of the portions of the distribution line 13 downstream of the filtering and/or conditioning and/or purifying devices 19, this may be accomplished by opening only the bypass valves 47 that immediately proceed those portions of the distribution lines 13 downstream of filtering and/or conditioning and/or purifying devices 19 chosen to be sanitized. For example, with respect to ground maintenance, portions of the distribution line 13 downstream of the filtering and/or conditioning and/or purifying devices 19 that lead to lavatories may be sanitized (with cartridge 23 changes occurring afterward) with a sanitizing solution having 100 parts per million of a sanitizing agent every 30, 60, or 90 days, and portions of the distribution line 13 downstream of the filtering and/or conditioning and/or purifying devices 19 that lead to galleys and fountains may be sanitized with a sanitizing solution having 100 parts per million of a sanitizing agent every 6 months, which leads to big savings in aircraft systems maintenance programs.

This invention provides significant water management cost savings while at the same time improving drinking water safety and quality.

The invention claimed is:

1. A potable water distribution system, comprising
a distribution line having an inlet port and at least one outlet port,
a filtering and/or conditioning and/or purifying device mounted along the distribution line for filtering and/or conditioning and/or purifying a fluid received from the distribution line before said fluid exits from the potable water distribution system through an outlet port of the distribution line,
valve means connected to the distribution line for controlling when fluid may exit the potable water distribution system through an outlet port of the distribution line, and
an apparatus mounted between the distribution line and the filtering and/or conditioning and/or purifying device for bypassing fluid moving in the distribution line past said filtering and/or conditioning and/or purifying device,
the apparatus comprising
a body having a first passageway extending through it,
an inlet port formed at an inlet end portion of the first passageway, the inlet port of the first passageway being connected to the distribution line to receive fluid therefrom,
an outlet port formed at an outlet end portion of the first passageway, the outlet port of the first passageway being connected to an inlet port of the filtering and/or conditioning and/or purifying device to permit fluid to flow from the outlet port of the first passageway into the inlet port of the filtering and/or conditioning and/or purifying device,
the body having a second passageway extending through it,
an inlet port formed at an inlet end portion of the second passageway, the inlet port of the second passageway being connected to an outlet port of the filtering and/or conditioning and/or purifying device to permit fluid to flow from the outlet port of the filtering and/or conditioning and/or purifying device to the inlet port of the second passageway,
an outlet port formed at an outlet end portion of the second passageway, the outlet port of the second passageway being connected to a fluid receiving line leading to an outlet port of the distribution line to permit fluid to flow from the outlet port of the second passageway into the fluid receiving line,
the body having a third passageway extending between the first passageway and the second passageway, and
a bypass valve having a portion that when positioned in a blocking position in the third passageway blocks flow of fluid through the third passageway and that when withdrawn from a blocking position in the third passageway opens the third passageway to permit fluid to flow through the third passageway;
wherein said first passageway and said second passageway communicate with each other through said filtering and/or conditioning and/or purifying device when said bypass valve is closed, and wherein said first passageway and said second passageway communicate with each other through said third passageway when said bypass valve is open; and
wherein the first passageway and the second passageway remain open and accessible along their entire lengths to sanitizing solution when the bypass valve is open and sanitizing solution is introduced into the distribution line,
the body having a first member and a second member, the second member being mounted on the first member,
the first passageway extending through the body being defined by a first bore formed in and extending through the first member of the body and a first bore formed in and extending through the second member of the body, the first bore in the first member of the body being aligned with the first bore in the second member of the body,
the second passageway extending through the body being defined by a second bore formed in and extending through the first member of the body and a second bore formed in and extending through the second member of the body, the second bore in the first member of the body being aligned with the second bore in the second member of the body, and further including
a first inlet tube positioned in the first bore of the first member of the body, the first inlet tube having a first end portion and a second end portion, the first end portion of the first inlet tube being configured to connect to the distribution line, and the second end portion of the first inlet tube being provided with a side opening to permit fluid to flow from the first passageway into and through the third passageway when the bypass valve is open, and sealing means for sealing between the first inlet tube and the first member of the body,
a first outlet tube positioned in the first bore of the second member of the body, the first outlet tube having a first end portion and a second end portion, the second end portion of the first outlet tube being configured to receive the inlet port of the filtering and/or conditioning and/or purifying device, and sealing means for sealing between the first outlet tube and the second member of the body,
a second inlet tube positioned in the second bore in the second member of the body, the second inlet tube having a first end portion and a second end portion, the first end portion of the second inlet tube being configured to connect to the outlet port of the filtering and/or conditioning and/or purifying device, and the second end portion of the second inlet tube being provided with a side opening to permit fluid to flow from the third passageway through the opening into the second passageway when the bypass valve is open, and sealing means for sealing between the second inlet tube and the second member of the body,
a second outlet tube positioned in the second bore of the first member of the body, the second outlet tube having a first end portion and a second; end portion, the second end portion of the second outlet tube being configured to connect to the distribution line, and sealing means for sealing between the second outlet tube and the first member of the body,
the first bore formed in the first member of the body having a first end portion and a second end portion, the second end portion of the first bore formed in the first member of the body being adjacent to the first bore formed in the second member of the body,
the second bore formed in the first member of the body having a first end portion and a second end portion, the first end portion of the second bore formed in the first member of the body being adjacent to the second bore formed in the second member of the body,
the third passageway being formed in the first member of the body and extending from the second end portion of the first bore formed in the first member of the body through the first member of the body to the first end portion of the second bore formed in the first member of the body, and sealing means for sealing between the first member of the body and the second member of the body.

2. An apparatus for bypassing fluid moving in a water distribution line of a potable water distribution system past a filtering and/or conditioning and/or purifying device mounted along the water distribution line for filtering and/or conditioning and/or purifying fluid received from the water distribution line, comprising a body having a first passageway extending through it, an inlet port formed at an inlet end portion of the first passageway, the inlet port of the first passageway being adapted to be connected to the water distribution line to receive fluid therefrom, an outlet port formed at an outlet end portion of the first passageway, the outlet port of the first passageway being adapted to be connected to an inlet port of the filtering and/or conditioning and/or purifying device when the filtering and/or conditioning and/or purifying device is connected to the apparatus to permit fluid to flow from the outlet port of the first passageway into the inlet port of the filtering and/or conditioning and/or purifying device, the body having a second passageway extending through it, an inlet port formed at an inlet end portion of the second passageway, the inlet port of the second passageway being adapted to be connected to an outlet port of the filtering and/or conditioning and/or purifying device when the filtering and/or conditioning and/or purifying device is connected to the apparatus to permit fluid to flow from the outlet port of the filtering and/or conditioning and/or purifying device to the inlet port of the second passageway, an outlet port formed at an outlet end portion of the second passageway, the outlet port of the second passageway being adapted to be connected to a fluid receiving line leading to an outlet port from the distribution line to permit fluid to flow from the outlet port of the second passageway into the fluid receiving line, the body having a third passageway extending between the first passageway and the second passageway, the third passageway being defined by a third passageway wall, and a bypass valve having a portion that when positioned in a blocking position in the third passageway blocks flow of fluid through the third passageway and that when withdrawn from a blocking position in the third passageway opens the third passageway to permit fluid to flow through the third passageway;

wherein said first passageway and said second passageway communicate with each other through said filtering and/or conditioning and/or purifying device when said bypass valve is closed, and wherein said first passageway and said second passageway communicate with each other through said third passageway when said bypass valve is open; and wherein the first passageway and the second passageway remain open and accessible along their entire lengths to sanitizing solution when the bypass valve is open and sanitizing solution is introduced into the distribution line, the body having a first member and a second member, the second member being mounted on the first member, the first passageway extending through the body being defined by a first bore formed in and extending through the first member of the body and a first bore formed in and extending through the second member of the body, the first bore in the first member of the body being aligned with the first bore in the second member of the body, the second passageway extending through the body being defined by a second bore formed in and extending through the first member of the body and a second bore formed in and extending through the second member of the body, the second bore in the first member of the body being aligned with the second bore in the second member of the body, and further including a first inlet tube positioned in the first bore of the first member of the body, the first inlet tube having a first end portion and a second end portion, the first end portion of the first inlet tube being configured to connect to the distribution line, and the second end portion of the first inlet tube being provided with a side opening to permit fluid to flow from the first passageway into and through the third passageway when the bypass valve is open, and sealing means for sealing between the first inlet tube and the first member of the body, a first outlet tube positioned in the first bore of the second member of the body, the first outlet tube having a first end portion and a second end portion, the second end portion of the first outlet tube being configured to receive the inlet port of the filtering and/or conditioning and/or purifying device, and sealing means for sealing between the first outlet tube and the second member of the body, a second inlet tube positioned in the second bore in the second member of the body, the second inlet tube having a first end portion and a second end portion, the first end portion of the second inlet tube being configured to connect to the outlet port of the filtering and/or conditioning and/or purifying device, and the second end portion of the second inlet tube being provided with a side opening to permit fluid to flow from the third passageway through the opening into the second passageway when the bypass valve is open, and sealing means for sealing between the second inlet tube and the second member of the body, a second outlet tube positioned in the second bore of the first member of the body, the second outlet tube having a first end portion and a second end portion, the second end portion of the second outlet tube being configured to connect to the distribution line, and sealing means for sealing between the second outlet tube and the first member of the body, the first bore formed in the first member of the body having a first end portion and a second end portion, the second end portion of the first bore formed in the first member of the body being adjacent to the first bore formed in the second member of the body, the second bore formed in the first member of the body having a first end portion and a second end portion, the first end portion of the second bore formed in the first member of the body being adjacent to the second bore formed in the second member of the body, the third passageway being formed in the first member of the body and extending from the second end portion of the first bore formed in the first member of the body through the first member of the body to the first end portion of the second bore formed in the first member of the body, and sealing means for sealing between the first member of the body and the second member of the body.

3. The system of claim 1, further including a water supply comprising water containing a sanitizing agent, the water containing the sanitizing agent being effective to sanitize against undesirable contaminants it may encounter when introduced into the distribution line, and means for moving fluid into and through the distribution line and the filtering and/or conditioning and/or purifying device attached thereto.

4. The system of claim 3, the water supply comprising a tank of said water.

5. The system of claim 1, further including a water supply, means for moving fluid into and through the distribution line and the filtering and/or conditioning and/or purifying device attached thereto, and means for introducing a sanitizing agent into water from the water supply as the water is moved into the distribution line.

6. The system of claim 1, further including means for moving fluid into and through the distribution line and the filtering and/or conditioning and/or purifying device attached thereto, and means for moving a sanitizing solution into the distribution line.

7. The system of claim 1, further including a water supply, means for moving fluid into and through the distribution line and the filtering and/or conditioning and/or purifying device attached thereto, and means for adding sanitizing agent to the water supply.

8. The system of claim 1, further including an actuator linked to the bypass valve for opening and closing the bypass valve.

9. The system of claim 8, the actuator being controlled remotely.

10. The system of claim 8, the actuator having means for receiving a wireless signal to activate or deactivate the actuator remotely.

11. The system of claim 8, further including an indicator linked to the actuator to indicate when the bypass valve is open or closed.

12. The apparatus of claim 2, the bypass valve including a shaft having a first end portion and a second end portion, a sealing member mounted on the first end portion of the shaft for sealing between the shaft and a portion of the third passageway wall to sealingly close the third passageway when the first end of the shaft is positioned in a blocking position in the third passageway, a biasing member mounted on the shaft for pushing the shaft into a position that closes the third passageway, and a handle pivotally mounted on the second end portion of the shaft, the handle having a cam formed thereon, wherein when the handle is positioned in a first position, the biasing member pushes the shaft into a position that closes the third passageway, and when the handle is positioned in a second position by pivoting the handle on its cam, the first end portion of the shaft is pulled into a position that opens the third passageway by withdrawing the first end portion of the shaft from a blocking position in the third passageway.

13. The apparatus of claim 2, further including an actuator linked to the bypass valve for opening and closing the bypass valve.

14. The apparatus of claim 13, the actuator being controlled remotely.

15. The apparatus of claim 13, the actuator having means for receiving a wireless signal to activate or deactivate the actuator remotely.

16. The apparatus of claim 2, the body being integrally connected to a wall of a pressure vessel of a filtering and/or conditioning and/or purifying device.

17. The system of claim 5, wherein an inflow received in said first passageway and said second passageway when said bypass valve is closed comprises potable water from said water supply, and wherein when said bypass valve is open said first passageway and said second passageway receive water into which said sanitizing agent has been introduced.

18. The system of claim 1, wherein said bypass valve portion, when withdrawn from said blocking position in the third passageway, allows diffusion of fluid flow into both said inlet port formed at said inlet end portion of the first passageway and the inlet port formed at the inlet end portion of the second passageway.

19. The system of claim 1, wherein said third passageway includes an inlet port that communicates with said first passageway, and wherein said third passageway includes an outlet port that communicates with said second passageway at a location of said second passageway between said filter outlet and said outlet port of said second passageway.

20. The system of claim 1, wherein said outlet port of said second passageway is in communication with said inlet port of said second passageway, wherein a check valve is provided between said outlet port of said filtering and/or conditioning and/or purifying device and said inlet port of said second passageway, and wherein, when said bypass valve is open, said second passageway communicates with said check valve and said third passageway.

21. The system of claim 20, wherein said check valve is disposed in said outlet portion of said filtering and/or conditioning and/or purifying device.

* * * * *